United States Patent
Hayashi et al.

(10) Patent No.: US 9,241,086 B1
(45) Date of Patent: Jan. 19, 2016

(54) IMAGE-READING APPARATUS

(71) Applicant: PFU Limited, Ishikawa (JP)

(72) Inventors: Masayoshi Hayashi, Ishikawa (JP); Kiyoto Kosaka, Ishikawa (JP); Ryo Hayashi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/788,295

(22) Filed: Jun. 30, 2015

(30) Foreign Application Priority Data

Mar. 19, 2015 (JP) .................................. 2015-056880

(51) Int. Cl.
- H04N 1/38 (2006.01)
- H04N 1/028 (2006.01)
- H04N 1/00 (2006.01)
- H04N 1/60 (2006.01)

(52) U.S. Cl.
CPC ....... H04N 1/02815 (2013.01); H04N 1/00734 (2013.01); H04N 1/00748 (2013.01)

(58) Field of Classification Search
None
See application file for complete search history.

(56) References Cited

U.S. PATENT DOCUMENTS

| 7,826,679 | B2 | 11/2010 | Honda et al. |
| 2006/0232830 | A1* | 10/2006 | Kobayashi ............ G06F 3/0421 358/448 |
| 2011/0142371 | A1 | 6/2011 | King et al. |
| 2012/0013954 | A1* | 1/2012 | Iguchi ................ H04N 1/00681 358/449 |

FOREIGN PATENT DOCUMENTS

| JP | 10-285377 A | 10/1998 |
| JP | 2001-268323 A | 9/2001 |
| JP | 2007-088654 A | 4/2007 |

* cited by examiner

Primary Examiner — Quang N Vo
(74) Attorney, Agent, or Firm — McDermott Will & Emery LLP

(57) ABSTRACT

An image-reading apparatus includes a case constituted to shut off ambient light and including an opening on a bottom surface thereof, an image capturing unit capturing an image of a medium in the case through the opening, a plurality of light sources disposed in the case to emit light to the opening, and an image-processing unit performing image capturing by the image capturing unit, and performing composition process on plural image data captured by the image capturing unit. The light sources emit light in a direction to form shadowed areas outside of different edges of the medium when the medium is smaller than an area of the opening, and the image-processing unit extracts the edges based on the shadowed areas in the image data and crops the medium from the image data based on the extracted edges.

10 Claims, 19 Drawing Sheets

FIG.1
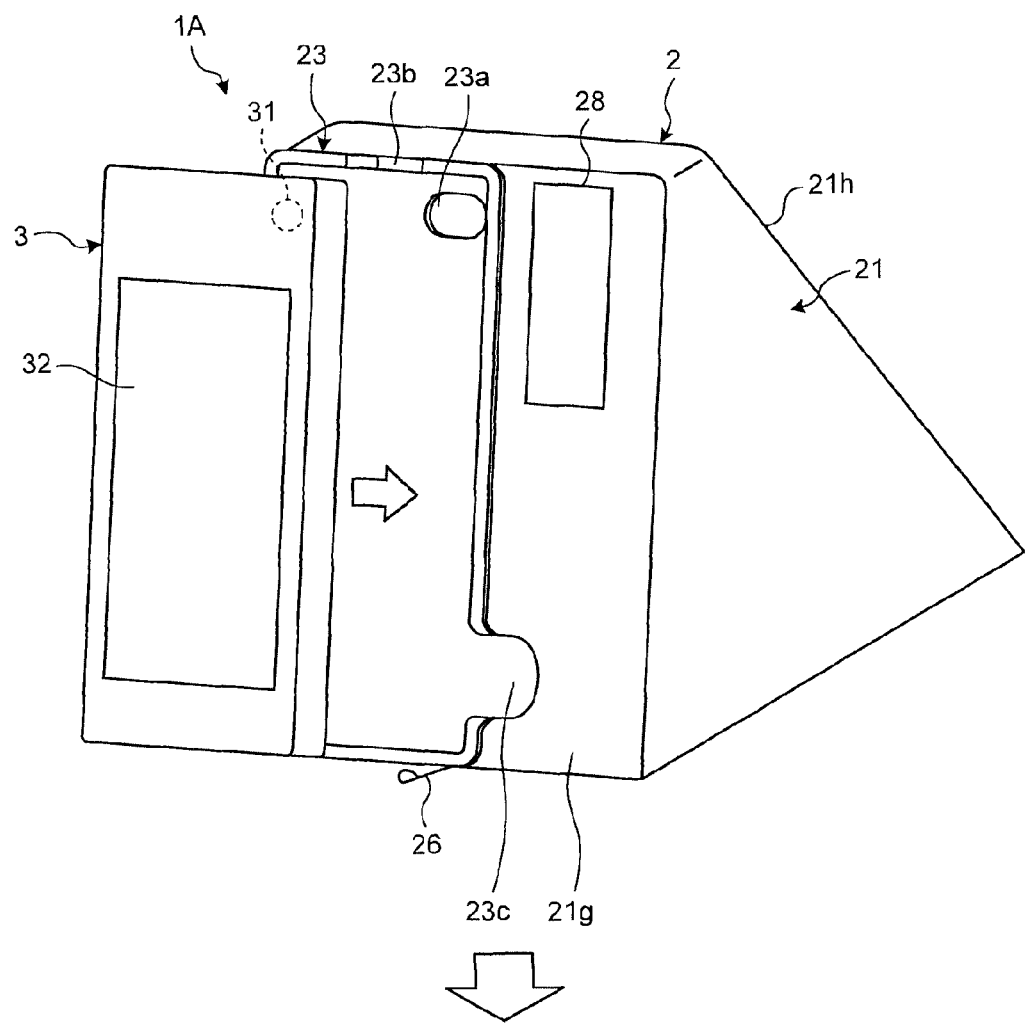
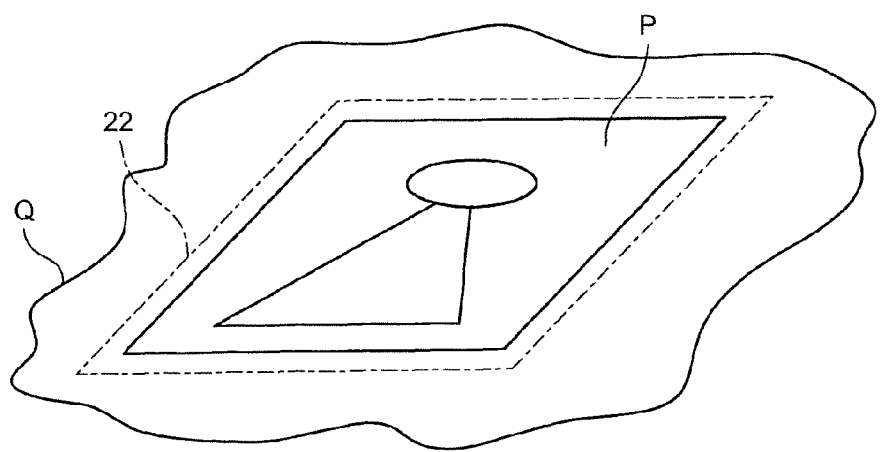

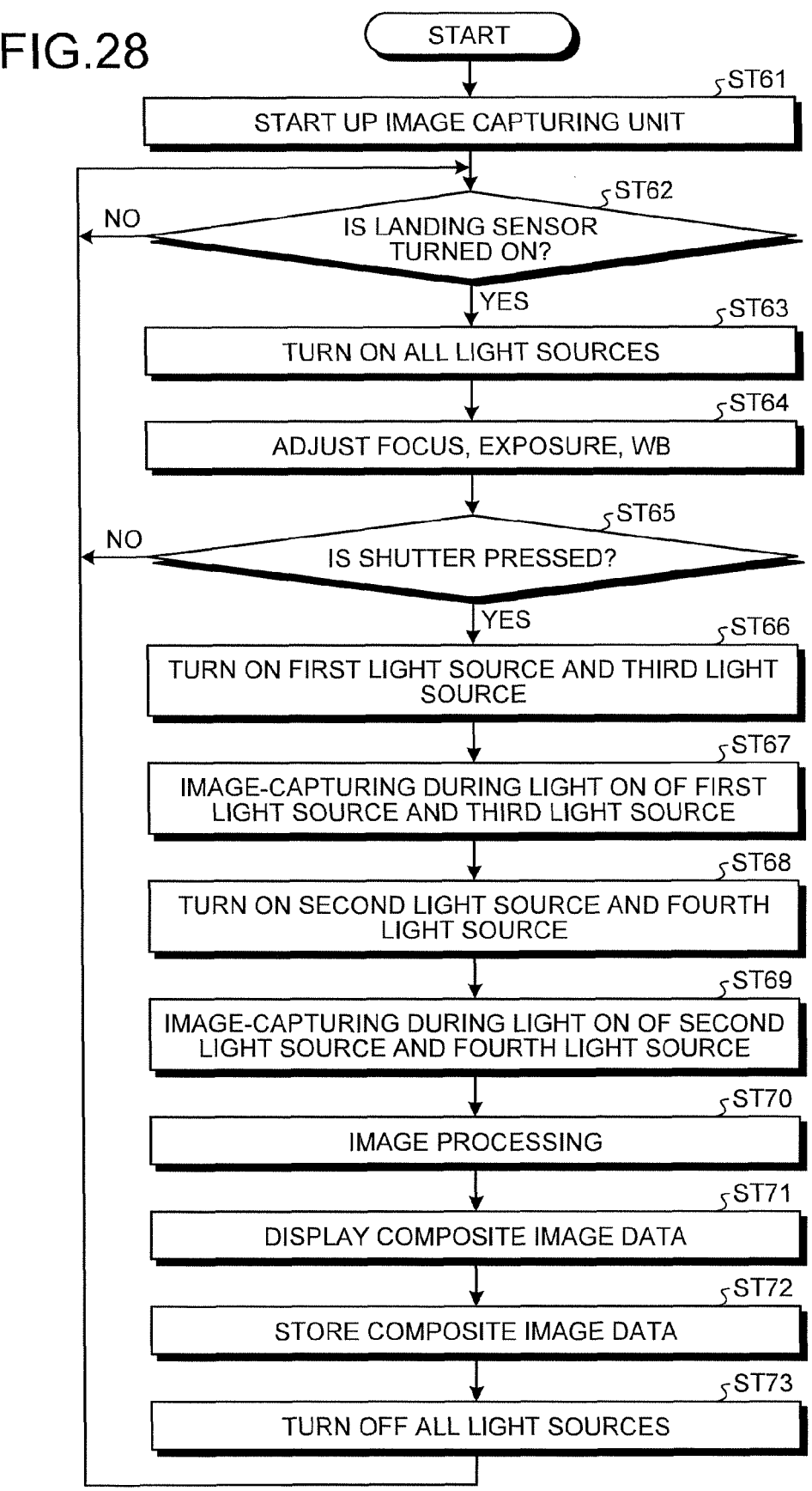

IMAGE-READING APPARATUS

CROSS-REFERENCE TO RELATED APPLICATION(S)

The present application claims priority to and incorporates by reference the entire contents of Japanese Patent Application No. 2015-056880 filed in Japan on Mar. 19, 2015.

BACKGROUND OF THE INVENTION

1. Field of the Invention

The present disclosure relates to an image-reading apparatus.

2. Description of the Related Art

There has been a desire to convert some media, such as a single photograph including a film photograph generated by photographing using a film camera, or a printed photograph obtained by printing based on a piece of image data, or a photograph album (album) including a plurality of photographs, into image data and store the converted image data in a hard disk or other recording media, or in a cloud computing environment. Image data is typically generated by reading media with an image-reading apparatus (e.g., a flatbed scanner, an automatic document feeder (ADF) scanner, an overhead scanner, a hand-held scanner, and a digital camera).

With a flatbed scanner, a user places one or more sheets of a single photograph, or an area of a photograph album including at least a photograph that one wishes to scan on a glass plate of the scanner. An image capturing unit of the scanner captures an image of a reading surface on the glass plate through the glass plate. With an ADF scanner, the image capturing unit can consecutively capture an image of a plurality of photographs. With an overhead scanner (refer to Japanese Patent Application Laid-open No. 2001-268323) or a digital camera, a user places one or more sheets of a single photograph, or an area of a photograph album including at least a photograph that one wishes to scan within an image-capturing area of an image capturing unit. The image capturing unit captures an image of a reading surface facing the image capturing unit. With a hand-held scanner (refer to the publication of US Patent Application No. 2011/0142371), a user holds the hand-held scanner and moves the scanner while the scanner is in contact with the single photograph or the photograph album to enable an image capturing unit of the scanner to capture an image of the whole area of the photograph.

With an image-reading apparatus that reads a medium one by one such as an ADF scanner, an image of the medium is read by an image capturing unit that captures the image of the medium on a back pad in a monotone color. The back pad in a monotone color is used to obtain an image of the medium having a background in a uniform monotone color such as white or black. Subsequently, image processing is performed on an image of the medium being read, thereby generating final image data. In the image processing, an edge detection is performed in which the borderline between the medium and the background is detected in the read image of the medium from both top to bottom, and left to right. After that, the linearity of the detected edge is obtained, thereby locating the medium. Then, the image including only the medium without the background is cropped (refer to Japanese Patent Application Laid-open No. 2007-88654).

As for an edge detection of image processing, a technique has been reported, in which an image-reading apparatus reads an image of a medium using a line sensor such as a charge coupled device (CCD). The image-reading apparatus detects a shadowed area generated due to irradiation of the medium having an unevenness in a thickness direction with light emitted from a light source, through detecting the asymmetry of the inclination of an edge. When the image-reading apparatus determines the shadowed area, image processing is performed to eliminate the determined shadowed area, or the shadowed area and some pixels at or near the shadowed area (Japanese Patent Application Laid-open No. 10-285377).

It is also desired to prevent the medium from being damaged, readily convert the medium into image data, thereby generating high-quality image data. Actually, with a flatbed scanner, an ADF scanner, or an overhead scanner, a user has to bring the medium to the position where the scanner is installed and dispose the medium so as to be captured by the image capturing unit. With an ADF scanner, for example, before converting a photograph from a photograph album into image data, the user first has to take out the photograph from the photograph album. When using a photograph album in which a photograph is fixed with an adhesive, the photograph is damaged when being separated from the album. In addition, once a photograph is separated from the album, the adhesive force of the adhesive decreases, resulting in the difficulty of re-attaching the photograph to the photograph album.

With an ADF scanner, a photograph is conveyed by a carriage roller to the image capturing unit, resulting in damaging the photograph. In the same manner, with a hand-held scanner, the medium comes into contact with the scanner, and the medium is likely to be damaged.

In addition, when converting a single photograph into image data using a hand-held scanner, the user has to hold the photograph by hand, for example, to fix the photograph. Furthermore, the user has to move the hand-held scanner, resulting in the user to perform more work, which bothers the user. Since the user moves the hand-held scanner on the medium, a relative velocity between the medium and the hand-held scanner becomes variable, which makes it difficult to maintain the quality of the generated image data at a high level.

When using an overhead scanner or a digital camera, the photograph or the photograph album is exposed to the outside during image-capturing, and thus effected by the external environment. A photographic paper used for film photograph or a glossy paper used for a printed photograph has a higher reflection factor in comparison with plain paper. Ambient light emitted from the outside to the medium is therefore reflected on the reading surface of the medium and then is incident on the image capturing unit. This results in an inconvenience caused by an increase of the reflected ambient light which may be incident on the image capturing unit, i.e. reflections of the ambient light are generated, which makes it difficult to maintain an image level of the image data generated at high level.

In a conventional image-reading apparatus, although, cropping an image of the medium being read is performed by focusing on an edge component or a color component of an image, it is difficult to crop an image of the medium with high-accuracy according to this method. Therefore, further improvement is required.

SUMMARY OF THE INVENTION

It is an object of the present invention to at least partially solve the problems in the conventional technology.

According to an aspect of the invention, an image-reading apparatus includes a case constituted to shut off ambient light and including an opening on a bottom surface thereof, an image capturing unit capturing an image of a medium exposed to an interior of the case through the opening, a plurality of light sources disposed in the interior of the case to emit light to the opening, and an image-processing unit configured to perform a plurality of image capturing by the image capturing unit, and perform composition process on a plurality of pieces of image data captured by the image capturing unit. The light sources are arranged to emit light in a direction to form shadowed areas outside of different edges of the medium when an area of the medium exposed to the interior of the case is smaller than an area of the opening, and the image-processing unit is configured to extract the edges based on the shadowed areas in the pieces of image data and crops the medium from the image data obtained by the composition process based on the extracted edges.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an external view of an image-reading apparatus according to a first embodiment of the present invention;

FIG. 28 is a flowchart diagram of reading operations in the image-reading apparatus according to the third embodiment.

DETAILED DESCRIPTION OF THE PREFERRED EMBODIMENTS

An image-reading apparatus according to embodiments of the present invention will now be described in detail with reference to the accompanying drawings. The present invention, however, is not limited to the following embodiments. The components of the following embodiments include components that can be easily replaced by persons skilled in the art or that are substantially the same as the components known by those in the art.

First Embodiment

Figure 2:
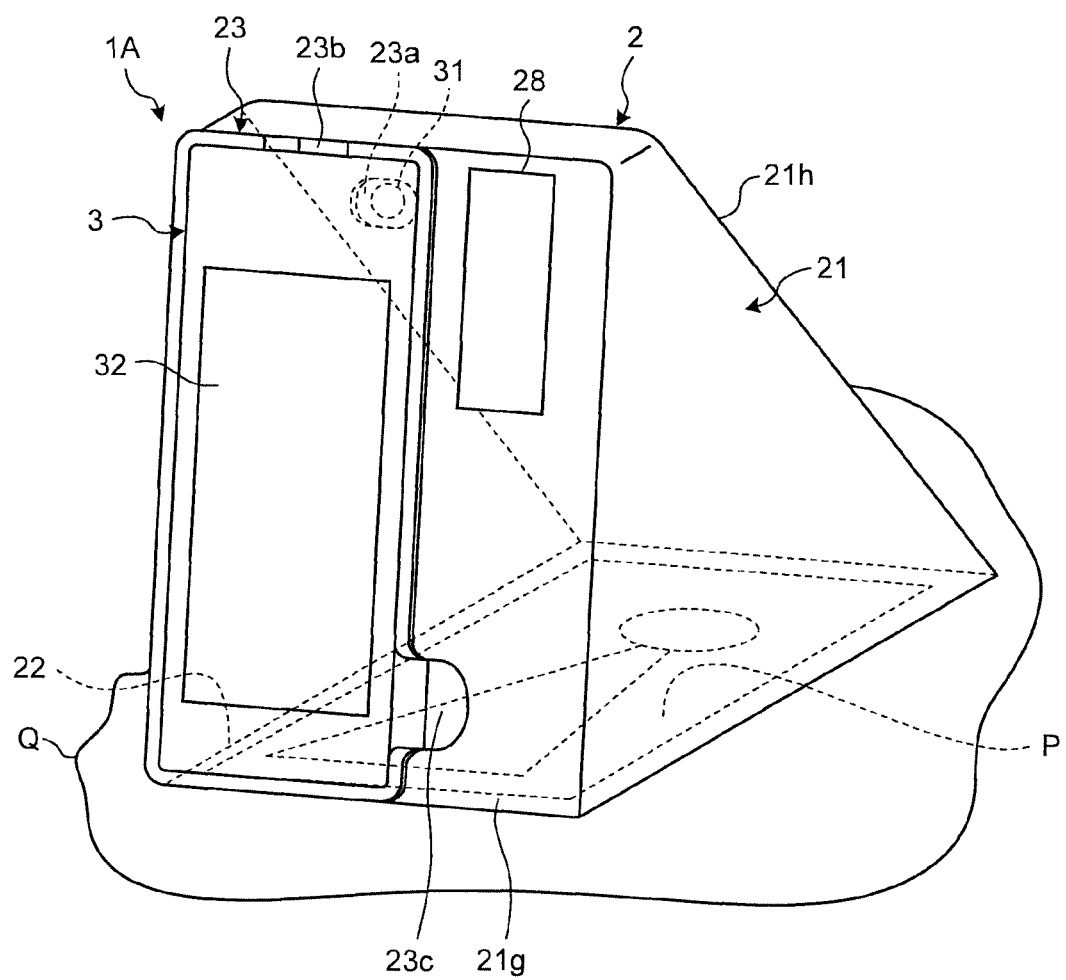
FIG. 2 is a view illustrating a using state of the image-reading apparatus according to the first embodiment.
Figure 3:
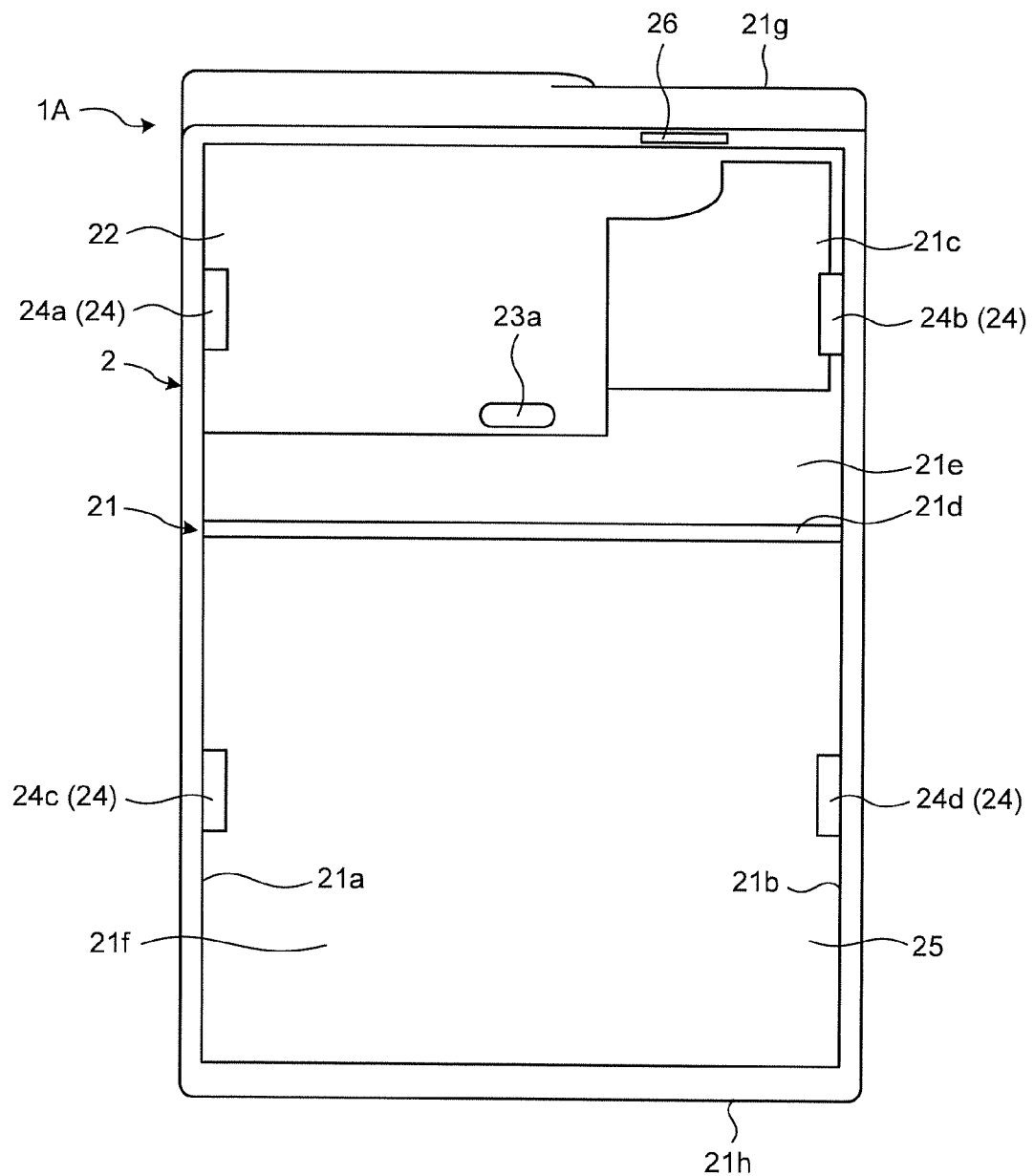
FIG. 3 is a bottom view of a case of the image-reading apparatus according to the first embodiment.
Figure 4:
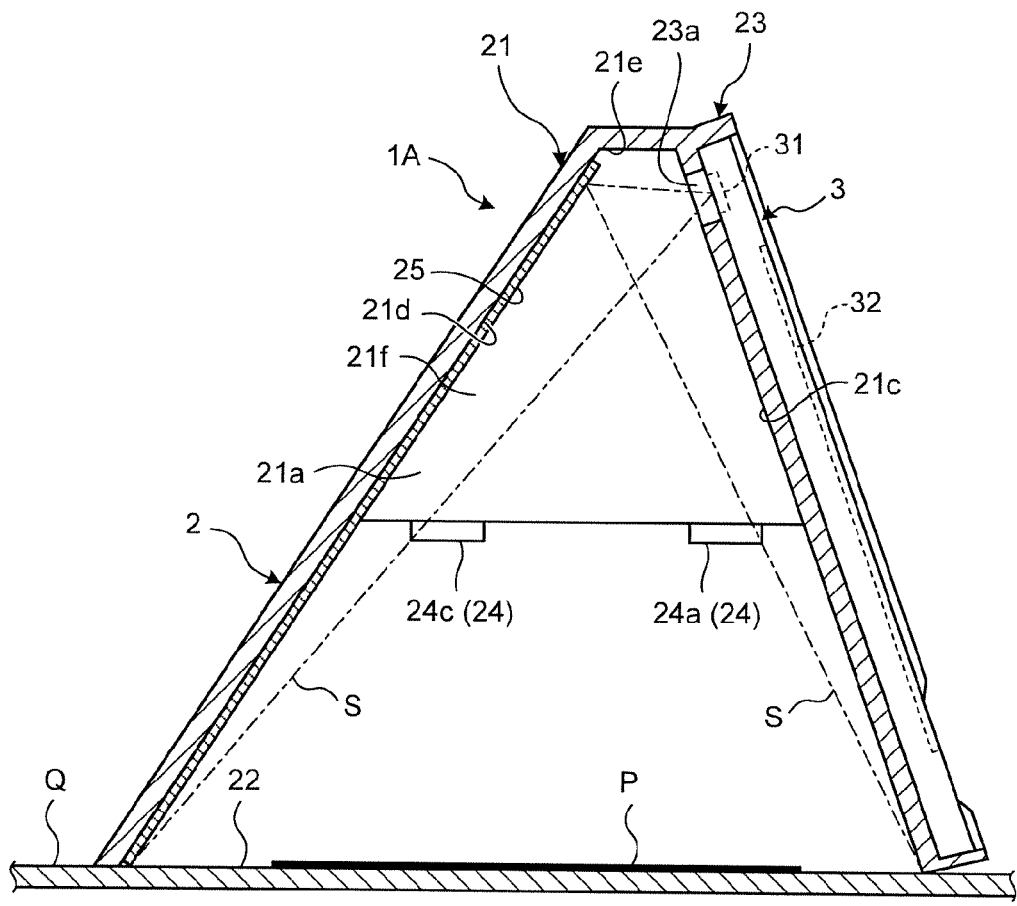
FIG. 4 is a cross-sectional view of the image-reading apparatus in a using state according to the first embodiment.
Figure 5:
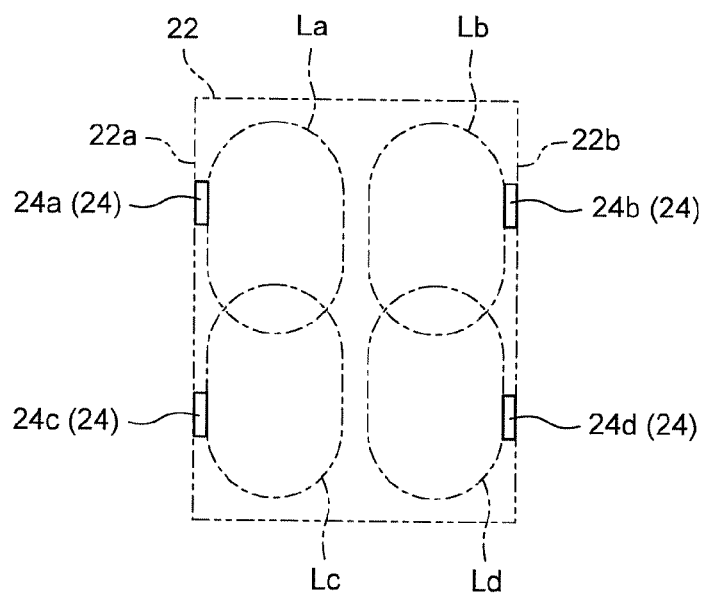
FIG. 5 is a view of main irradiated areas according to the first embodiment.
Figure 6:
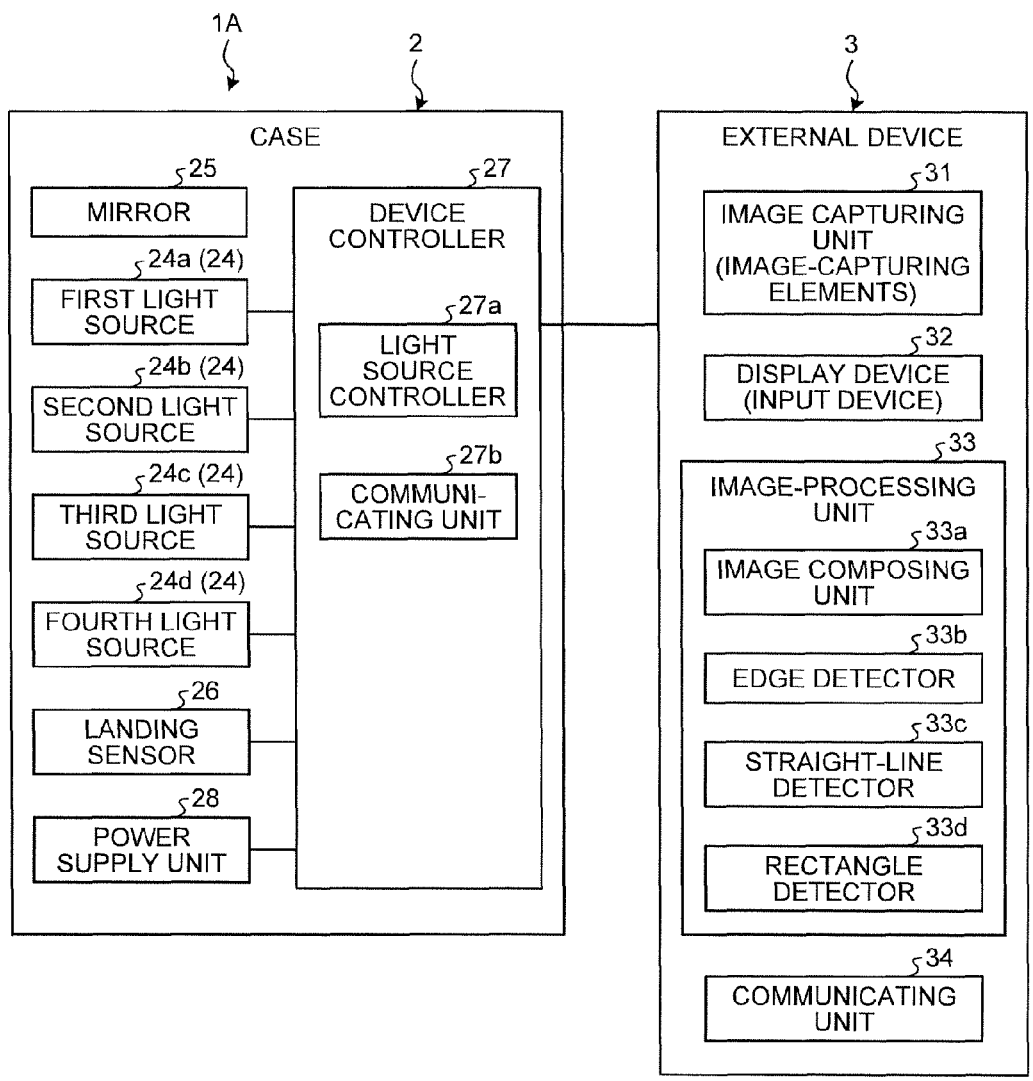
FIG. 6 is a view illustrating an example of the outline configuration of the image-reading apparatus according to the first embodiment.

FIG. 1 is an external view of an image-reading apparatus according to a first embodiment of the present invention. FIG. 2 is a view illustrating a using state of the image-reading apparatus according to the first embodiment. FIG. 3 is a bottom view of a case of the image-reading apparatus. FIG. 4 is a cross-sectional view of the image-reading apparatus in a using state. FIG. 5 is a view of main irradiated areas according to the first embodiment. FIG. 6 is a view illustrating an example of the outline configuration of the image-reading apparatus according to the first embodiment. An image-reading apparatus 1A according to the first embodiment is a hand-held size. As illustrated in FIGS. 1 and 2, a medium P is placed on a placement surface Q and the image-reading apparatus 1A can generate image data corresponding to the medium P by image-capturing the medium P using an image capturing unit 31. The placement surface Q is a portion of the surface of a table or a desk, or alternatively, a flat board on which the medium P is be placed. The image-reading apparatus 1A according to the present embodiment reads a single photograph such as a film photograph or a printed photograph as a medium P and generates image data corresponding to the single photograph.

The image-reading apparatus 1A according to the present embodiment may read a photograph album including photographs or printed photographs as a medium P. The image-reading apparatus 1A reads a single photograph in the photograph album as a target area for reading, and generates image data corresponding to the single photograph in the photograph album. The use of the image-reading apparatus 1A according to the present embodiment is not limited to the above-described examples. The image-reading apparatus 1A may be used for any medium from which a user generates image data. Not only images on glossy paper (e.g., a single film photograph, a single printed photograph, and a page in a magazine), but also images on plain paper, can be used as media for the present embodiment.

The image-reading apparatus 1A includes, as illustrated in FIG. 1, a case 2, and an external device 3. The image-reading apparatus 1A also includes, as illustrated in FIG. 6, a plurality of light sources 24, a mirror 25, a landing sensor 26, an image capturing unit 31, and a display device 32. In the image-reading apparatus 1A according to the present embodiment, the case 2 includes the light sources 24 and the external device 3 includes image capturing unit 31 and the display device 32.

The case 2 is provided for the external device 3 having a stipulated external size and the image capturing unit 31 on a stipulated position, or the external device 3 having an external shape and the image capturing unit 31 on a position within a certain scope. That is, the case 2 is provided for the external device 3 of the same series, for example. As illustrated in FIGS. 3 and 4, the case 2 is constituted to shut off the ambient light, and includes an opening 22 on its bottom surface. The external device 3 is detachably attached to the case 2. The case 2 includes a main body part 21, the opening 22, a storage portion 23, a plurality of light sources 24, the mirror 25, the landing sensor 26, a device controller 27, and a power supply unit 28.

The main body part 21 is made of a resin material through which no ambient light is transmitted (e.g., a black synthetic resin). The main body part 21 has the opening 22 on its bottom surface and has a box shape. The main body part 21 includes a pair of inner side surfaces 21a and 21b facing each other, a pair of an exposing face 21c and an opposed surface 21d facing each other, a ceiling surface 21e, and the opening 22, all of which form an inner space of the main body part 21, that is, an interior of a case 21f. When viewed from sides of an inner side surface 21a and an inner side surface 21b, the interior of the case 21f toward the opening 22 is formed so as to expand the space between a pair of the exposing face 21c and the opposed surface 21d facing each other, i.e., distance between the exposing face 21c and the opposed surface 21d expands toward the opening 22. That is, the interior of the case 21f is formed in a trapezoidal shape having the exposing face 21c and the opposed surface 21d both inclined. The main body part 21 also has a trapezoidal shape as an external shape. The main body part 21 includes an inclined surface 21g corresponding to the exposing face 21c and an inclined surface 21h corresponding to the opposed surface 21d, both along the interior of the case 21f.

As illustrated in FIG. 1, if the case 2 covers a medium P placed on the placement surface Q, the opening 22 overlaps with the placement surface Q and exposes the medium P to the interior of the case 21f. The opening 22 according to the present embodiment has such an area that it covers a photograph having at least an L size (89 mm×127 mm). Taking into account the image processing described later, a margin is provided between the periphery of the opening 22 and the periphery of the photograph while the center of the L-sized photograph is aligned with the center of the opening 22, and accordingly, the opening 22 preferably has an area with a size of 102 mm×140 mm, for example. Note that the opening 22 has no member that blocks communications of the interior of the case 21f to the outside. In the embodiments described below, it is assumed that the area of the medium P that is exposed to the interior of the case is smaller than the area of the opening 22, as described above.

The storage portion 23 is provided outside of the case 2 and holds the external device 3. The storage portion 23 according to the present embodiment is a frame member provided on the inclined surface 21g and is capable of holding the external device 3. The storage portion 23 has a clearance between itself and the store external device 3 so that the stored external device 3 is detachable. Accordingly, the image capturing unit 31 and the display device 32 are mounted on the external device 3, rather than the case 2, however, the image capturing unit 31 and the display device 32 are detachably attached to the case 2. The storage portion 23 is provided on the inclined surface 21g, which enables positioning the external device 3 to the case 2 based on the bottom of the stored external device 3. On the storage portion 23, an aperture for capturing images 23a is provided. As illustrated in FIG. 4, the aperture for capturing images 23a is a through hole passing through from the inclined surface 21g to the exposing face 21c and is provided on a position opposite to the image capturing unit 31 on the external device 3 stored in the storage portion 23. That is, through the exposing face 21c on the case 2, the interior of the case 21f can be exposed to the image capturing unit 31 on the external device 3. The storage portion 23 includes a notch 23b and a finger hole 23c which enables communications to the space in which the external device 3 is stored. The notch 23b and the finger hole 23c enable the outer circumferential surface of the external device 3 to be exposed to the outside with the external device 3 being stored in the storage portion 23. This configuration enables the user to access the external device 3 using at least one of the notch 23b and the finger hole 23c and readily remove the external device 3 from the storage portion 23.

As illustrated in FIG. 4, the light sources 24 are disposed in the interior of the case 21f and emit light to the opening 22. As illustrated in FIG. 3, the light sources 24 according to the present embodiment include four light sources: a first light source 24a, a second light source 24b, a third light source 24c, and a fourth light source 24d. The first light source 24a, the second light source 24b, the third light source 24c, and the fourth light source 24d each include light-emitting devices such as a light-emitting diode (LED) or a laser diode (LD) and are turned on by the power from the power supply unit 28. As illustrated in FIGS. 3 and 4, the first light source 24a and the third light source 24c are provided on the inner side surface 21a. The first light source 24a is positioned on the exposing face 21c side and the third light source 24c is positioned on the opposed surface 21d side. The first light source 24a and the third light source 24c are disposed having an interval therebetween. In the same manner, the second light source 24b and the fourth light source 24d are provided on the inner side surface 21b. The second light source 24b is positioned on the exposing face 21c side and the fourth light source 24d is positioned on the opposed surface 21d side. The second light source 24b and the fourth light source 24d are disposed having an interval therebetween. The interval between the first light source 24a and the third light source 24c and the interval between the second light source 24b and the fourth light source 24d are the same interval. The position of the first light source 24a provided on the inner side surface 21a and the position of the second light source 24b provided on the inner side surface 21b opposite to the inner side surface 21a are opposite to each other. In the same manner, the position of the third light source 24c provided on the inner side surface 21a and the position of the fourth light source 24d provided on the inner side surface 21b opposite to the inner side surface 21a are opposite to each other.

The first light source 24a, the second light source 24b, the third light source 24c, and the fourth light source 24d have sufficient amount of light capable of image-capturing the whole area of the medium P exposed through the opening 22 to the interior of the case 21f (the area including a portion of the placement surface Q around the medium P). The first light source 24a and the third light source 24c, and the second light source 24b and the fourth light source 24d emit light to different areas on the horizontal plane in the opening 22, respectively. An optical axis of the first light source 24a and an optical axis of the third light source 24c are on the inner side surface 21a side in the opening 22. An optical axis of the second light source 24b and an optical axis of the fourth light source 24d are on the inner side surface 21b side in the opening 22. That is, as illustrated in FIG. 5, the first light source 24a has a main irradiated area La and the second light source 24b has a main irradiated area Lb. The main irradiated area La and the main irradiated area Lb are on a pair of sides opposite to each other on the horizontal plane in the opening 22, and specifically, the first light source 24a has the main irradiated area La on a side 22a side corresponding to the inner side surface 21a, and the second light source 24b has the main irradiated area Lb on a side 22b side corresponding to the inner side surface 21b. In the same manner, the third light source 24c has a main irradiated area Lc and the fourth light source 24d has a main irradiated area Ld. The main irradiated area Lc and the main irradiated area Ld are on a pair of sides opposite to each other on the horizontal plane in the opening 22, and specifically, the third light source 24c has the main irradiated area Lc on a side 22a side corresponding to the inner side surface 21a, and the fourth light source 24d has the main irradiated area Ld on a side 22b side corresponding to the inner side surface 21b. With this configuration, the first light source 24a and the second light source 24b emit light to the horizontal plane in the opening 22 so that their respective main irradiated areas La and Lb do not overlap with each other. In the same manner, the third light source 24c and the fourth light source 24d emit light to the horizontal plane in the opening 22 so that their respective main irradiated areas Lc and Ld do not overlap with each other. The main irradiated areas La, Lb, Lc, and Ld are defined as areas where, among the light from the first light source 24a, the second light source 24b, the third light source 24c, and the fourth light source 24d, a light reflected on the medium P and is directly, in the present embodiment, through the mirror 25, incident on the image capturing unit 31 is irradiated. In these areas, due to reflections of the first light source 24a, the second light source 24b, the third light source 24c, and the fourth light source 24d on the generated image data, images cannot be recognized in the areas on the medium P corresponding to the areas where reflections occur.

The mirror 25 enables the image capturing unit 31 to capture an image of the medium P exposed to the interior of the case 21f through the opening 22. As illustrated in FIG. 4, the mirror 25 is provided on the opposed surface 21d opposite to the exposing face 21c from which the image capturing unit 31 exposes. The positional relation among the image capturing unit 31, the mirror 25, and the opening 22 (including the angle of the opening 22 with respect to the horizontal plane) is defined such that an image-capturing area S of the image capturing unit 31 through the mirror 25 (refer to the alternate long and short dash line in FIG. 4) is equal to or larger than the area of the opening 22. That is, the image capturing unit 31 can capture an image of the whole area of the medium P exposed to the interior of the case 21f through the opening 22. Since the image capturing unit 31 captures an image of the medium P through the mirror 25, the position of the image capturing unit 31 with respect to the opening 22 due to the image-capturing area of the image capturing unit 31 is prevented from being determined unambiguously. Accordingly, this configuration determines the position of the image capturing unit 31 in the case 2 arbitrarily, thereby suppressing the size of the case 2. In addition, determining the stored position of the external device 3 in the case 2 arbitrarily enables the storage portion 23 for holding the external device 3 to be disposed on a position taking into account the easiness of attaching to or detaching from the case 2.

The landing sensor 26 serves as an image-capturing state detector to detect whether the opening 22 is blocked, that is, image-capturing by the image capturing unit 31 is ready. As illustrated in FIGS. 1 and 3, the landing sensor 26 according to the present embodiment is disposed on the bottom surface of the case 2. The landing sensor 26 is a mechanical sensor that turns ON by a deformation of its arm due to the placement surface Q or the medium P when the bottom surface of the case 2 closely comes in contact with the placement surface Q or the medium P, that is, when the opening 22 is blocked by the placement surface Q or the medium P.

As illustrated in FIG. 6, the device controller 27 controls some devices and components included in the case 2. The device controller 27 includes a light source controller 27a and a communicating unit 27b. The device controller 27 is a computer including a central processing unit (CPU), a random access memory (RAM), and a read only memory (ROM). The CPU functions as a controller to execute various types of processes and the RAM and ROM function as memory to store various types of information. All or some functions of the above-described device controller 27 are achieved by loading a computer application program stored in the ROM to the RAM and executing by the CPU, thereby reading or writing data in the RAM or ROM.

The light source controller 27a controls the light sources 24 to turn on. Specifically, the light source controller 27a is capable of controlling the amount of light and the timing of lighting of the first light source 24a, the second light source 24b, the third light source 24c, and the fourth light source 24d. If the landing sensor 26 detects that the opening 22 is blocked, the light source controller 27a according to the present embodiment turns on the first light source 24a, the second light source 24b, the third light source 24c, and the fourth light source 24d at the same time. The light source controller 27a may turn off the first light source 24a, the second light source 24b, the third light source 24c, and the fourth light source 24d at the same time after a certain time period of the simultaneous light-on state elapses. The light source controller 27a turns on the first light source 24a and the third light source 24c, turns off the first light source 24a and the third light source 24c, and then turns on the second light source 24b and the fourth light source 24d, turns off the second light source 24b and the fourth light source 24d, for example, based on a light source switching signal from the external device 3. For another example, the light source controller 27a may turn on the first light source 24a alone, turn off the first light source 24a, and then turn on the fourth light source 24d alone, turn off the fourth light source 24d based on the light source switching signal from the external device 3. Alternatively, the light source controller 27a may turn on the third light source 24c alone, turn off the third light source 24c, and then turn on the second light source 24b alone, turn off the second light source 24b based on the light source switching signal from the external device 3. The communicating unit 27b electrically couples the case 2 to the external device 3 and exchanges information between the communicating unit 27b and the communicating unit 34. The communicating unit 27b and the communicating unit 34 exchange information through radio wireless communications using a radio wave or optical wireless communications using color patterns or flashing patterns of light.

As illustrated in FIG. 6, the power supply unit 28 supplies power to some devices and components included in the case 2, that is, the light sources 24 and the device controller 27. The power supply unit 28 according to the present embodiment is a primary battery or a secondary battery.

The external device 3, being provided separately from the case 2, is installed with an application software for reading corresponding to the function as the image-reading apparatus 1A in advance or loaded (including download) from a recording medium for installation. The external device 3 according to the present embodiment is a mobile terminal, such as a smart phone or a tablet, having a function as the image-reading apparatus 1A and other functions of a telephone and internet connection, for example. As illustrated in FIGS. 1 and 6, the external device 3 includes an image capturing unit 31, a display device 32, an image-processing unit 33, a communicating unit 34, a power supply unit (not-illustrated), and a storage device (not-illustrated). The image-processing unit 33 further includes at least an image composing unit 33a, an edge detector 33b, a straight-line detector 33c, and a rectangle detector 33d.

As illustrated in FIG. 4, the image capturing unit 31 captures an image of the medium P exposed to the interior of the case 21f through the opening 22. The image capturing unit 31 is provided on the back surface of the external device 3 (a side opposite to a side on which the display device 32 is provided), and the image capturing unit 31 includes image-capturing elements, disposed in a plane, such as a charge coupled device (CCD) image sensor or a complementary metal oxide semiconductor (CMOS) image sensor driven by the power from the power supply unit. Each of the image-capturing elements outputs an image signal based on an output value corresponding to an incident light for every exposure to the image-processing unit 33. That is, the image capturing unit 31 captures an image of the medium P using image-capturing elements disposed in a plane at the same time. The image capturing unit 31 performs image-capturing control of the image-capturing elements, such as an exposure timing or an exposure time. The image capturing unit 31 exposes the image-capturing elements when the light sources 24 are turned on. The image capturing unit 31 according to the present embodiment continues image-capturing the medium P in the simultaneous light-on state of the first light source 24a, the second light source 24b, the third light source 24c, and the fourth light source 24d. The image capturing unit 31 captures an image of the medium P once when the first light source 24a and the third light source 24c are turned on, and once when the second light source 24b and the fourth light source 24d are turned on. In other words, in the image-capturing by the image capturing unit 31, out of the light sources 24, the light sources (the second light source 24b and the fourth light source 24d, in this example) are turned on that are different from the light sources (the first light source 24a and the third light source 24c, in this example) turned on in the previous image-capturing.

As illustrated in FIG. 1, the display device 32 displays an image of the medium P captured by the image capturing unit 31. The display device 32 is disposed on the front surface of the external device 3. The display device 32 is a display such as a liquid crystal display and an organic light emitting display driven by power from the power supply unit. The display device 32 displays an image captured by the image capturing unit 31 (an image corresponding to the medium P if the medium P is exposed to the interior of the case 21f through the opening 22) based on an image data signal output from the image-processing unit 33. The display device 32 according to the present embodiment is a touch panel display including a function as an input device in addition to a function as an output device of the external device 3. If a user presses an arbitrary position on the display device 32, an electric signal corresponding to the position is output to components or devices included in the external device 3. While the application software for reading is running, a shutter release button is displayed as a shutter release icon on the display device 32. When the user presses the shutter release icon, an image-capturing instruction signal is output to the image capturing unit 31 to instruct the image capturing unit 31 to capture an image, and the image capturing unit 31 captures the image.

The image-processing unit 33 processes image data corresponding to an image of the medium P captured by the image capturing unit 31. The image-processing unit 33 captures an image of the opening 22 and generates image data based on the image signal output from the image capturing unit 31. Accordingly, if the opening 22 is blocked by the placement surface Q and the medium P, image data corresponding to an image of the medium P is generated.

Figure 7:
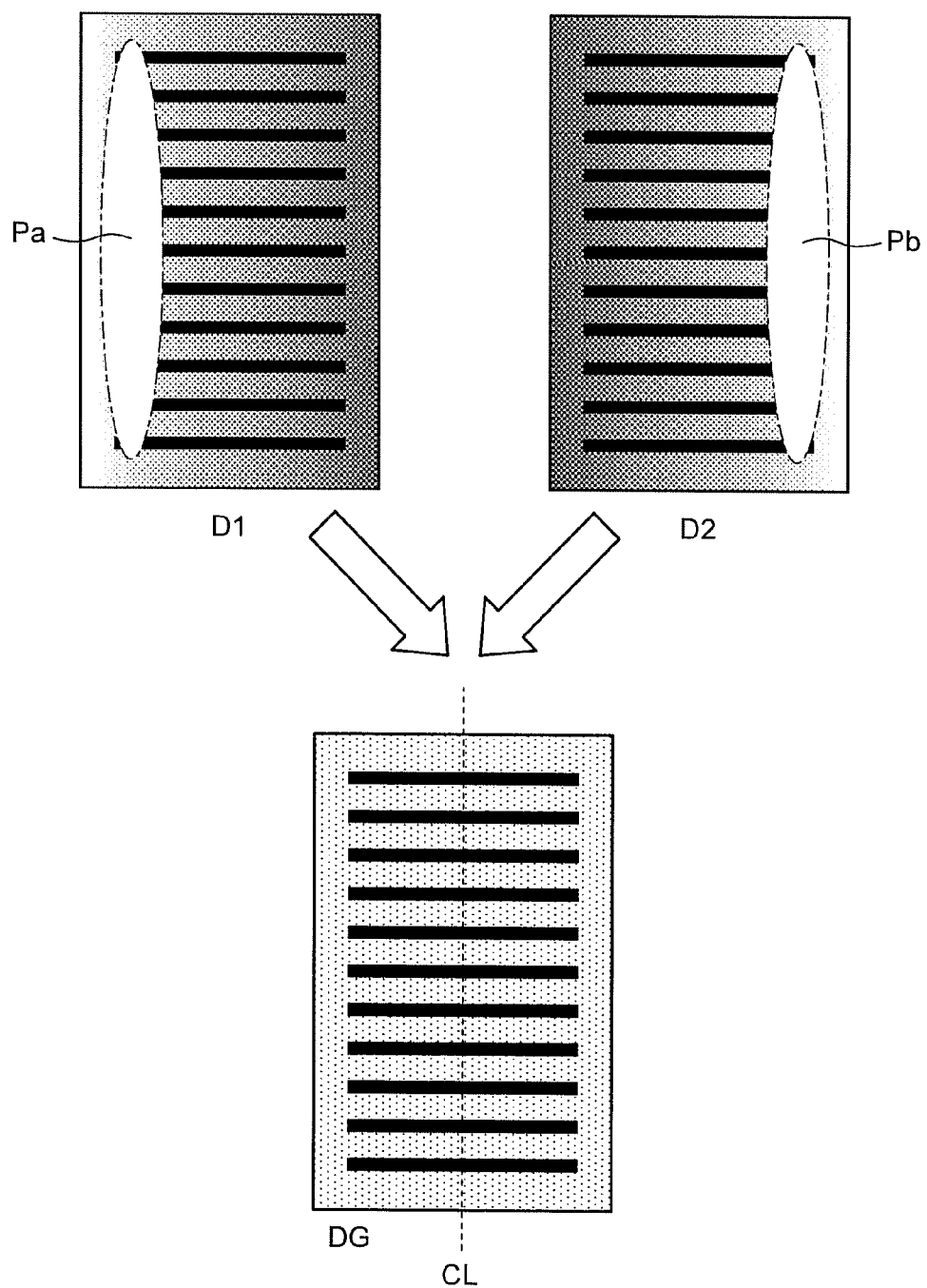
FIG. 7 is a view illustrating a piece of composite image data according to the first embodiment.

As illustrated in FIG. 7, the image composing unit 33a in the image-processing unit 33 generates composite image data DG that is image data in which first image data D1 and second image data D2 are combined. The first image data D1 is generated through image-capturing by the image capturing unit 31 when the first light source 24a and the third light source 24c are turned on. The second image data D2 is generated through image-capturing by the image capturing unit 31 when the second light source 24b and the fourth light source 24d are turned on. The first image data D1 is generated through image-capturing when the first light source 24a and the third light source 24c are turned on, and thus reflections Pa of the first light source 24a and the third light source 24c occur in an area corresponding to the main irradiated area La and the main irradiated area Lc, in which images corresponding to the medium P cannot be recognized. By contrast, the second image data D2 is generated through image-capturing when the second light source 24b and the fourth light source 24d are turned on, and thus reflections Pb of the second light source 24b and the fourth light source 24d occur in an area corresponding to the main irradiated area Lb and the main irradiated area Ld, in which images corresponding to the medium P cannot be recognized. The reflection Pa and the reflection Pb each occur in different positions on the image data. This is because the first light source 24a and the third light source 24c, and the second light source 24b and the fourth light source 24d emit light to different areas on the horizontal plane in the opening 22, respectively. Accordingly, in the first image data D1, an image can be recognized in the areas in the medium P which correspond to the areas where reflections Pb occur. In the second image data D2, an image can be recognized in the areas in the medium P which correspond to the areas where reflections Pa occur. The image composing unit 33a extracts from both pieces of image data D1 and D2 the areas in which images on the medium P can be recognized, thereby generating the composite image data DG. The image composing unit 33a according to the present embodiment determines the center line CL of both pieces of image data D1 and D2 as a borderline. The center line CL is positioned between both the reflections Pa and Pb on both pieces of image data D1 and D2. The image composing unit 33a extracts from the first image data D1 the area on the opposite side to the area where the reflections Pa occur with respect to the center line CL. The image composing unit 33a also extracts from the second image data D2 the area on the opposite side to the area where the reflections Pb occur with respect to the center line CL. The image composing unit 33a then composes image data corresponding to the extracted two areas, thereby generating the composite image data DG. That is, the generated composite image data DG includes only the areas with high image quality out of both pieces of image data D1 and D2. As described above, the image-processing unit 33 performs a composition process on a plurality of pieces of image data corresponding to images of the medium P captured by the image capturing unit 31 in image-capturing by the image capturing unit 31.

In addition, the image-processing unit 33 performs various types of corrections on the composite image data DG generated by the image composing unit 33a. Examples of the corrections include smoothing a borderline, an inversion correction of mirror-image, a perspective transform, cropping a rectangular image, and a gamma correction, which will be described in detail later. In the present embodiment, cropping a rectangular image, among other corrections, is performed by the edge detector 33b, the straight-line detector 33c, and the rectangle detector 33d in the image-processing unit 33.

The communicating unit 34 electrically couples the external device 3 to the case 2 and exchanges information between the communicating unit 34 and the communicating unit 27b. The communicating unit 34 according to the present embodiment outputs a light source switching signal to the communicating unit 27b.

Figure 8:
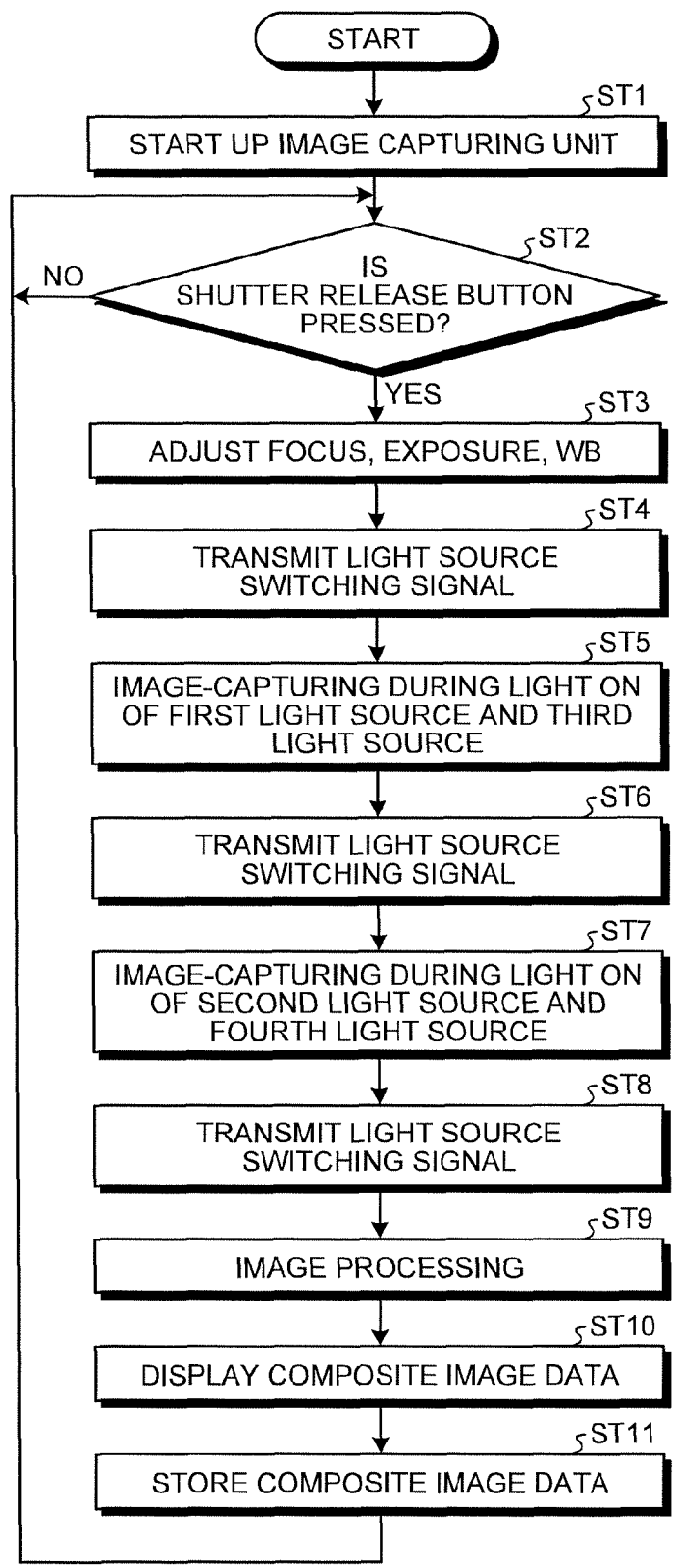
FIG. 8 is a flowchart diagram of reading operations in the image-reading apparatus according to the first embodiment.

The following describes the reading of the medium P by the image-reading apparatus 1A according to the present embodiment. FIG. 7 is a view illustrating a piece of composite image data. FIGS. 8 to 11 are flowchart diagrams of reading operations of the image-reading apparatus according to the first embodiment. The reading of the medium P by the image-reading apparatus 1A is performed with the external device 3 being attached to the case 2. Firstly, as illustrated in FIG. 8, the external device 3 starts up the image capturing unit 31 based on an instruction by the user to execute the application software for reading in the external device 3 (Step ST1). The instruction by the user to execute the application software for reading is, for example, achieved by the user to operate the touch panel on the display device 32 to display an icon of the start button for the application software for reading on the display device 32, and press the start button. This operation starts the image capturing unit 31 to continue image-capturing of the opening 22 and enables the image signals to be sequentially output to the image-processing unit 33. The image-processing unit 33 sequentially generates a plurality of pieces of image data based on which images are generated and sequentially displayed on the display device 32. During the operations, a shutter release icon is displayed together with the images on the display device 32. The external device 3 determines whether the shutter release icon is pressed (Step ST2) repeatedly until the shutter release icon is pressed and stands by until the shutter release icon is Pressed.

Figure 9:
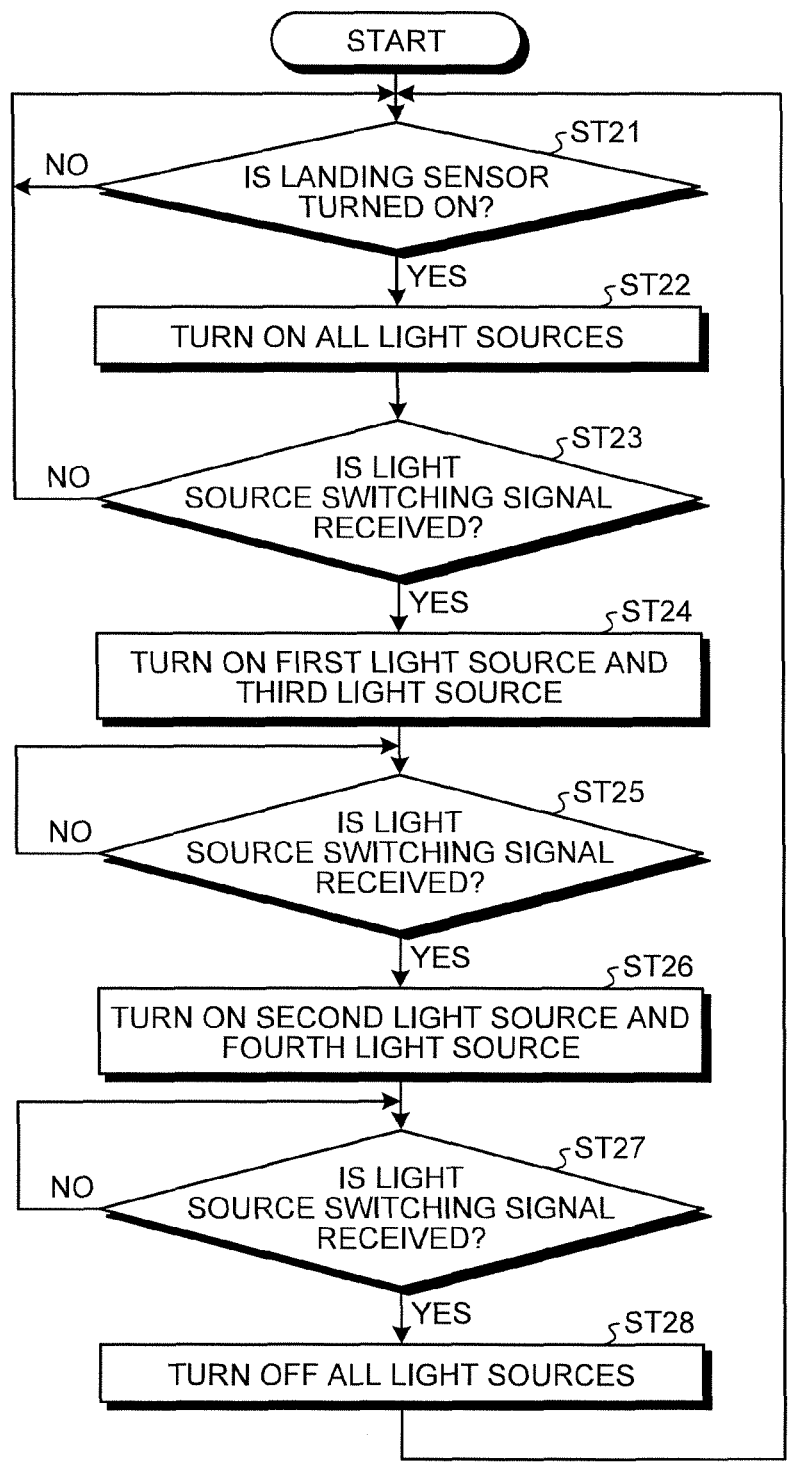
FIG. 9 is a flowchart diagram of reading operations in the image-reading apparatus according to the first embodiment.

Subsequently, the user confirms the medium P to be read and positions the image-reading apparatus 1A manually onto the medium P such that the opening 22 faces the placement surface Q including the medium P. During above operation, the light sources 24 are in the turned-off state. As illustrated in FIG. 9, the device controller 27 determines whether the landing sensor 26 is turned ON (Step ST21) repeatedly until the landing sensor 26 is turned ON and stands by until the landing sensor 26 is turned ON.

Subsequently, as illustrated in FIG. 2, the user lowers the image-reading apparatus 1A towards the placement surface Q to enable the case 2 to closely come into contact with the placement surface Q where the medium P is placed on (alternatively, enabling the case 2 to closely come into contact with the medium P if the size of the medium P is larger than that of the opening 22). During the operations, the light sources 24 are in the turned-off state thus the interior of the case 21f is extremely dark. Although the image capturing unit 31 sequentially captures images of the medium P placed on the placement surface Q that blocks the opening 22, no corresponding image of the medium P can be recognized in the sequentially generated images. Accordingly, no image of the medium P can be recognized either in the images based on the image data sequentially displayed on the display device 32. The case 2 closely comes in contact with the placement surface Q and the opening 22 is blocked, whereby the landing sensor 26 turns ON. Accordingly, as illustrated in FIG. 9, the device controller 27 determines that the landing sensor 26 is ON (Yes at Step ST21) and turns on all of the light sources (Step ST22). When the landing sensor 26 detects that the opening 22 is blocked, the light source controller 27a turns on all of the light sources 24. Accordingly, the interior of the case 21f is irradiated with the light from the light sources 24, and the medium P placed on the placement surface Q is irradiated with the light from the light sources 24 directly, or indirectly through the mirror 25. That is, the display device 32 displays images captured by the image capturing unit 31 with the light sources 24 in the light-on state. When the image capturing unit 31 sequentially captures images of the medium P placed on the placement surface Q that blocks the opening 22, corresponding images of the medium P can be recognized in the sequentially generated images. Accordingly, images of the medium P can be recognized in the images based on the image data sequentially displayed on the display device 32. This allows a user to adjust the positional relation between the medium P and the opening 22 and cover the medium P within the area of the opening 22 based on images displayed on the display device 32. Although the reflections Pa and Pb occur in the image data, the positional relation between the medium P and the opening 22 can be recognized. As illustrated in FIG. 9, the light source controller 27a determines whether the light source switching signal is received (Step ST23) repeatedly until a later-described first light source switch-on signal is received and stands by until the first light source switch-on signal is received.

If a user presses the shutter release icon on the display device 32, as illustrated in FIG. 8, the external device 3 determines that the shutter release icon is pressed (Yes at Step ST2) and performs adjustments of focus, exposure, and white balance (WB) (Step ST3). The image capturing unit 31 performs these adjustments on two areas, one is an opposite side to the area where the reflections Pa occur from the first image data D1, and the other is an opposite side to the area where the reflections Pb occur from the second image data D2. These adjustments are achieved by setting image-capturing conditions of the image capturing unit 31 based on the environment of the interior of the case 21f so as to obtain the optimum image quality.

Subsequently, as illustrated in FIG. 8, the external device 3 transmits a light source switching signal (Step ST4). The external device 3 transmits a first light source switching signal which is a light source switching signal to enable the light source controller 27a of the case 2 to turn on the first light source 24*a* and the third light source 24*c*, through the communicating unit 34 and the communicating unit 27*b*. As illustrated in FIG. 9, the light source controller 27*a* receives the first light source switch-on signal (Yes at Step ST23) and turns on the first light source 24*a* and the third light source 24*c* based on the first light source switch-on signal (Step ST24).

Subsequently, as illustrated in FIG. 8, in the external device 3, the image capturing unit 31 performs image-capturing while the first light source 24*a* and the third light source 24*c* are turned on (Step ST5). The image-processing unit 33 generates first image data D1 in which the reflections Pa occur corresponding to the first light source 24*a* and the third light source 24*c*. When generating the first image data D1, the display device 32 may display thereon an image based on the first image data D1. As illustrated in FIG. 9, the light source controller 27*a* determines whether the light source switching signal is received (Step ST25) repeatedly until a later-described second light source switch-on signal is received and stands by until the second light source switch-on signal is received to maintain the light-on state of the first light source 24*a* and the third light source 24*c*.

Subsequently, as illustrated in FIG. 8, the external device 3 transmits the light source switching signal (Step ST6). The external device 3 transmits a second light source switching signal which is a light source switching signal to enable the light source controller 27*a* to turn on the second light source 24*b* and the fourth light source 24*d*. As illustrated in FIG. 9, the light source controller 27*a* receives the second light source switch-on signal (Yes at Step ST25), turns off the first light source 24*a* and the third light source 24*c* and turns on the second light source 24*b* and the fourth light source 24*d* based on the second light source switch-on signal (Step ST26).

Subsequently, as illustrated in FIG. 8, in the external device 3, the image capturing unit 31 performs image-capturing while the second light source 24*b* and the fourth light source 24*d* are turned on (Step ST7). The image-processing unit 33 generates second image data D2 in which the reflections Pb occur corresponding to the second light source 24*b*. When generating the second image data D2, the display device 32 may display thereon an image based on the second image data D2. As illustrated in FIG. 9, the light source controller 27*a* determines whether the light source switching signal is received (Step ST27) repeatedly until a later-described all-light-sources switch-off signal is received and stands by until the all-light-sources switch-off signal is received to maintain the light-on state of the second light source 24*b* and the fourth light source 24*d*.

Subsequently, as illustrated in FIG. 8, the external device 3 transmits the light source switching signal (Step ST8). The external device 3 transmits the all-light-sources switch-off signal which is a light source switching signal to enable the light source controller 27*a* to turn off the second light source 24*b* and the fourth light source 24*d*. As illustrated in FIG. 9, the light source controller 27*a* receives the all-light-sources switch-off signal (Yes at Step ST27) and turns off the second light source 24*b* and the fourth light source 24*d*, and thus all of the light sources 24 based on the all-light-sources switch-off signal (Step ST28).

Figure 10:
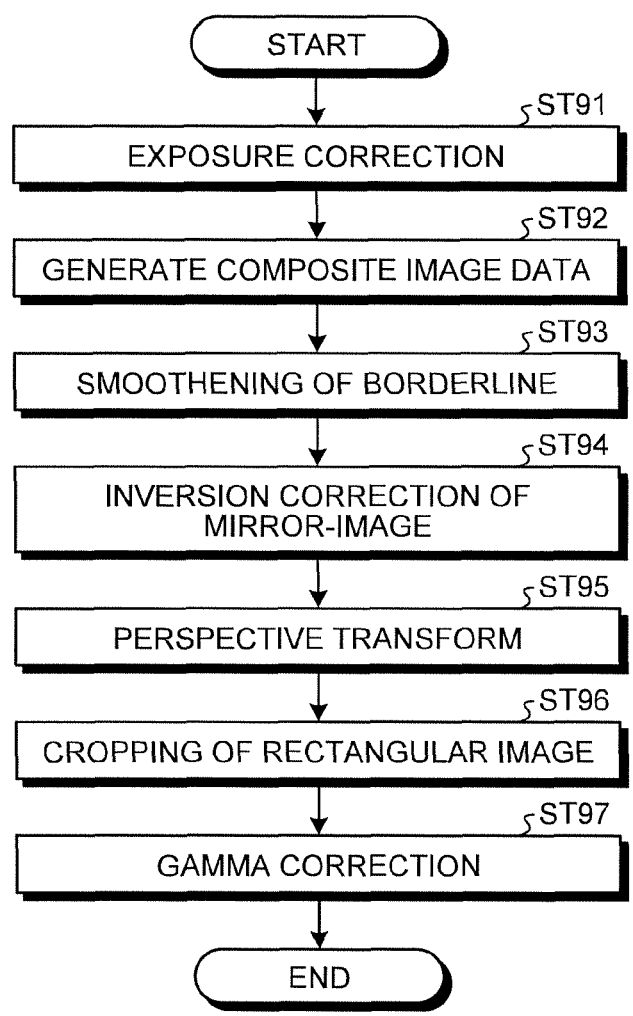
FIG. 10 is a flowchart diagram of reading operations in the image-reading apparatus according to the first embodiment.

Subsequently, the external device 3 performs image processing (Step ST9). The image-processing unit 33 mainly performs image processing of generating composite image data DG and correction of the composite image data DG. Firstly, as illustrated in FIG. 10, the image-processing unit 33 corrects the exposure of the image data (Step ST91). The image-processing unit 33 corrects the exposure of at least one of both pieces of image data D1 and D2 so as to reduce the difference of brightness between both pieces of image data D1 and D2. This step can reduce the difference of brightness occurring with the center line CL interposed therebetween in the composite image data DG generated from both pieces of image data D1 and D2.

Subsequently, the external device 3 generates composite image data DC (Step ST92). As illustrated in FIG. 7, the image composing unit 33*a* of the image-processing unit 33, as described above, generates the composite image data DG from both pieces of image data D1 and D2.

Subsequently, as illustrated in FIG. 10, the external device 3 performs the smoothing of the borderline (Step ST93). As illustrated in FIG. 7, the image-processing unit 33 executes either one of known smoothing processes such as composition process of rectangular images and feathering on the borderline of the composite image data DG, that is, on the pixel data on or near the center line CL, thereby smoothing the data on or near the center line CL. This step can prevent the composite image data DG from being recognized as image data generated by combining two images, i.e. the pieces of image data D1 and D2, with the center line CL interposed therebetween in the composite image data DG.

Subsequently, the external device 3 performs an inversion correction of mirror-image (Step ST94). Since the image capturing unit 31 captures an image of the medium P through the mirror 25 and through the opening 22, the image-processing unit 33 generates a piece of image data based on a mirror image that is reversed upside down. Thus, the image-processing unit 33 performs known inversion correction of mirror-image to invert the composite image data DG vertically.

Subsequently, the external device 3 performs a perspective transform (Step ST95). Since the image capturing unit 31 captures an image of the medium P through the mirror 25 and through the opening 22, the opening 22 having a rectangular shape looks to have a trapezoidal shape in the image capturing unit 31. Accordingly, an image seen in a rectangular shape on the medium P is seen in a trapezoidal shape in the image data generated by the image-processing unit 33. Therefore, with respect to the image data of the image on the medium P, the image-processing unit 33 determines an amount of deformation of the image based on the positional relation among the image capturing unit 31, the mirror 25, and the opening 22, the image-processing unit 33 performs the known perspective transform based on the amount of the deformation.

Subsequently, the external device 3 performs cropping of a rectangular image (Step ST96). The edge detector 33*b*, the straight-line detector 33*c*, and the rectangle detector 33*d* in the image-processing unit 33 perform cropping on a rectangular image. Specifically, the area corresponding to the medium P in the composite image data DG is cropped from the remaining area (i.e., a portion of the placement surface Q which is a background of the medium P). In the present embodiment, the image-processing unit 33 performs cropping on a rectangular image based on the shadowed areas formed outside of edges of the medium P, which are generated by the light emitted from the light sources 24 toward the medium P (refer to FIG. 12). This step enables the image-processing unit 33 to generate composite image data DG including only the area corresponding to the medium P.

Figure 11:
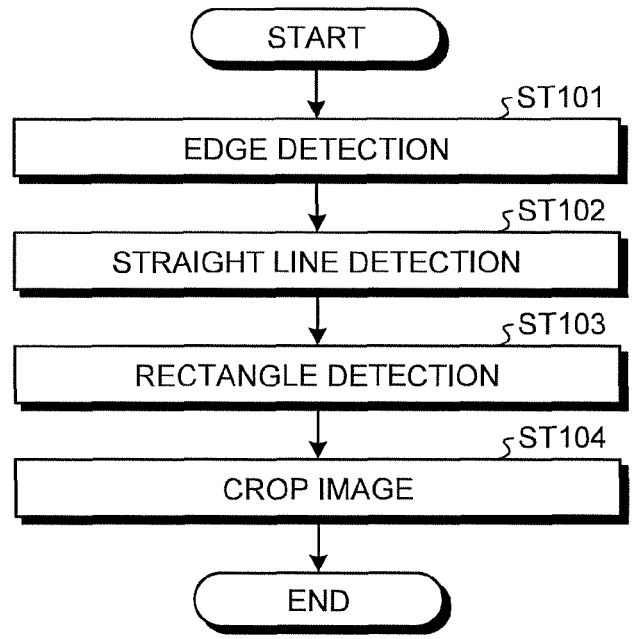
FIG. 11 is a flowchart diagram of reading operations in the image-reading apparatus according to the first embodiment.

The following describes in detail the processing of cropping of a rectangular image performed by the image-processing unit 33 at Step ST96 illustrated in FIG. 10, with reference to FIGS. 11 to 18. FIG. 11 is a flowchart diagram of reading operations of the image-reading apparatus according to the first embodiment. The following describes Step ST101 through ST104 in FIG. 11 that illustrates in detail the process at Step ST96 in FIG. 10, with reference to FIGS. 12 to 18 as appropriate.

As illustrated in FIG. 11, the edge detector 33b performs edge detection on the area corresponding to the medium P in the composite image data DG (Step ST101). In the present embodiment, edge detection on the area corresponding to the medium P is performed based on the shadowed area of the medium P generated by the light emitted by the light sources 24.

Figure 12:
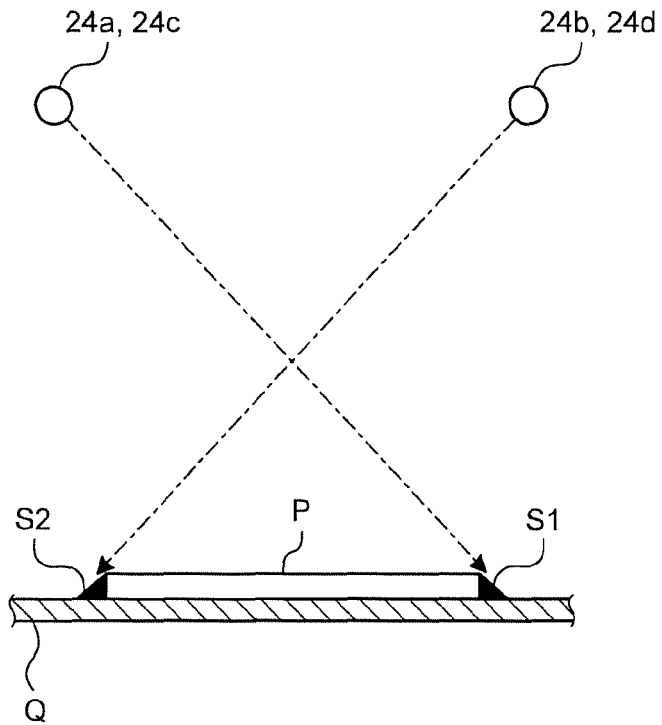
FIG. 12 is a view illustrating an example of shadowed areas of the medium generated by the light emitted from a plurality of light sources according to the first embodiment.

FIG. 12 is a view illustrating an example of shadowed areas of the medium generated by the light emitted from a plurality of light sources. FIG. 12 illustrates that shadowed areas S1 and S2 are formed outside of edges of the medium P generated by the light emitted from the light sources 24 toward the medium P, with respect to the medium P placed on the placement surface Q. That is, in the present embodiment, each of the light sources 24 emits light in such a direction so as to form the shadowed area S1 or S2 outside of edges of the medium P when the area of the medium P exposed to the interior of the case 21f is smaller than the area of the opening 22. In the example illustrated in FIG. 12, light is emitted from the first light source 24a and the third light source 24c provided on the inner side surface 21a toward the edge of the medium P near the inner side surface 21b side which is opposite to the inner side surface 21a, thereby forming the shadowed area S1 outside of the edge. The shadowed area S1 is formed when the first light source 24a and the third light source 24c are turned on at Step ST24 illustrated in FIG. 9. Also in the example illustrated in FIG. 12, light is emitted from the second light source 24b and the fourth light source 24d provided on the inner side surface 21b toward the edge of the medium P near the inner side surface 21a side opposite to the inner side surface 21b. Therefore, the shadowed area S2 is formed outside of the edge. The shadowed area S2 is formed when the second light source 24b and the fourth light source 24d are turned on at Step ST26 illustrated in FIG. 9.

Figure 13:
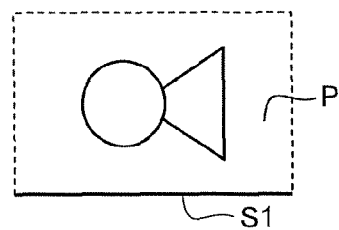
FIG. 13 is a view illustrating an example of an image of a medium including a shadowed area generated by a first light source and a third light source according to the first embodiment.
Figure 14:
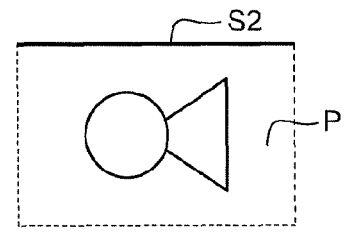
FIG. 14 is a view illustrating an example of an image of a medium including a shadowed area generated by a second light source and a fourth light source according to the first embodiment.

FIG. 13 is a view illustrating an example of an image of a medium including a shadowed area generated by the first light source and the third light source. FIG. 13 illustrates the first image data D1 of the medium P including the shadowed area S1 formed by the light emitted from the first light source 24a and the third light source 24c as illustrated in FIG. 12. First image data D1 is generated when the first light source 24a and the third light source 24c are turned on and an image of the medium P is captured at Step ST5 illustrated in FIG. 8. FIG. 14 is a view illustrating an example of an image of a medium including a shadowed area generated by the second light source and the fourth light source. FIG. 14 illustrates the second image data D2 of the medium P including the shadowed area S2 formed by the light emitted from the second light source 24b and the fourth light source 24d as illustrated in FIG. 12. Second image data D2 is generated when the second light source 24b and the fourth light source 24d are turned on and an image of the medium P is captured at Step ST7 illustrated in FIG. 8. In the examples illustrated in FIGS. 13 and 14, the medium P has a rectangular shape and each of the light sources 24 emits light in such a direction so as to form the shadowed area S1 or S2 outside of the edges corresponding to the two sides opposite to each other out of the edges corresponding to the four sides of the medium P.

Figure 15:
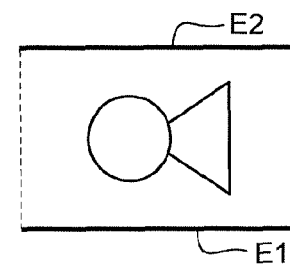
FIG. 15 is a view illustrating an example of a detection result of edges corresponding to the shadowed areas of the medium according to the first embodiment.

The edge detector 33b performs edge detection on the area corresponding to the medium P in the composite image data DG at Step ST101 illustrated in FIG. 11. The composite image data DG is obtained by combining the first image data D1 including the shadowed area S1 illustrated in FIG. 13 with the second image data D2 including the shadowed area S2 illustrated in FIG. 14 (refer to FIG. 15). FIG. 15 is a view illustrating an example of a detection result of edges corresponding to the shadowed areas of the medium. The detection result in FIG. 15 illustrates that the edge detector 33b detects an edge E1 corresponding to the shadowed area S1 illustrated in FIG. 13 and an edge E2 corresponding to the shadowed area S2 illustrated in FIG. 14. In addition, the edge detector 33b extracts the edges E1 and E2 of the medium P, each of which corresponds to respective one of two opposite sides of the medium P, based on the shadowed areas S1 and S2 in a plurality of pieces of image data. The edge detector 33b also connects both the ends of the extracted edges E1 and E2 corresponding to the respective two sides, thereby defining virtual edges corresponding to the remaining two sides of the medium P at Step ST101 illustrated in FIG. 11.

Figure 16:
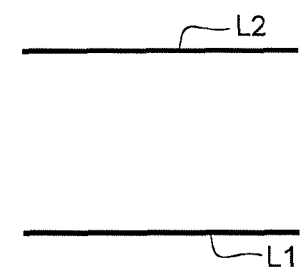
FIG. 16 is a view illustrating an example of a detection result of horizontal lines corresponding to the edges on the medium according to the first embodiment.
Figure 17:
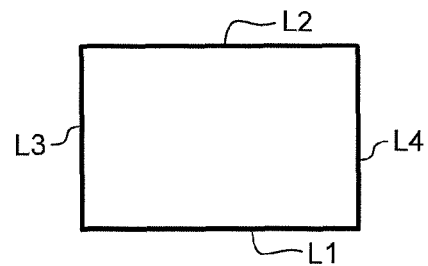
FIG. 17 is a view illustrating an example of a detection result of vertical lines corresponding to virtual edges connecting the ends of the horizontal lines to each other according to the first embodiment.

The straight-line detector 33c detects horizontal lines respectively corresponding to the edges E1 and E2 illustrated in FIG. 15 (refer to FIG. 16) as straight lines representing a portion of the outline of the medium P (Step ST102). FIG. 16 is a view illustrating an example of a detection result of horizontal lines corresponding to the edges on the medium. The detection result in FIG. 16 illustrates that the straight-line detector 33c detects horizontal lines L1 and L2 corresponding to the respective edges E1 and E2 illustrated in FIG. 15. In Step ST102 illustrated in FIG. 11, the straight-line detector 33c detects vertical lines L3, L4 (refer to FIG. 17), which correspond to presumed virtual edges, as straight lines indicating an outline of the medium P. FIG. 17 is a view illustrating an example of a detection result of vertical lines which correspond to virtual edges connecting respective ends of the horizontal lines. The detection result in FIG. 17 illustrates that the straight-line detector 33c detects vertical lines 13 and L4 corresponding to the respective presumed virtual edges.

Figure 18:
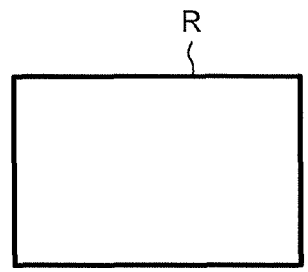
FIG. 18 is a view illustrating an example of a detection result of a rectangle corresponding to the edges and the virtual edges according to the first embodiment.

The rectangle detector 33d detects a rectangle R (refer to FIG. 18) formed by the horizontal lines L1 and 12, and the vertical lines L3 and L4 illustrated in FIG. 17 as the outline of the medium P (Step ST103). FIG. 18 is a view illustrating an example of a detection result of a rectangle corresponding to the edges and the virtual edges. The detection result in FIG. 18 illustrates that the rectangle detector 33d detects a rectangle R formed by the horizontal lines L1 and L2, and the vertical lines L3 and L4.

The image-processing unit 33 crops only the area in the rectangle R illustrated in FIG. 18 (i.e., the outline of the medium P) as the area corresponding to the medium P in the composite image data DG (Step ST104), from the remaining area (i.e., a portion of the placement surface Q which is a background of the medium P). After that, the process sequence proceeds to Step ST97 illustrated in FIG. 10.

As described above, the image-processing unit 33 extracts the edges E1 and E2 based on the shadowed areas S1 and S2 in a plurality of pieces of image data. The image-processing unit 33 also crops the medium P from the image data obtained by the composition process based on the extracted edges E1 and E2. More specifically, the image-processing unit 33 extracts the edges E1 and E2 each corresponding to the respective two opposite sides of the medium P based on the shadowed areas S1 and S2 in a plurality of pieces of image data. The image-processing unit 33 also connects respective ends of the extracted edges E1 and E2 corresponding to the respective two sides, and presumes virtual edges corresponding to the remaining two sides of the medium P, and crops the image of the medium P from the image data obtained by the composition process based on the edges E1 and E2 and the virtual edges.

Subsequently, as illustrated in FIG. 10, the external device 3 performs a gamma correction on the cropped image of the medium P (Step ST97). The image-processing unit 33 performs a known gamma correction on the composite image data DG based on the properties of the display device 32 or the properties of other standard display devices.

Subsequently, as illustrated in FIG. 8, the external device 3 displays on the display device 32 an image based on the composite image data DG (Step ST10). The external device 3 according to the present embodiment displays an image based on the composite image data DG obtained by various types of Processes.

Subsequently, the external device 3 stores the composite image data DG (Step ST11). The external device 3 according to the present embodiment stores in a storage device the composite image data DG obtained by various types of processes.

The external device 3 stores in a not-illustrated storage device the composite image data DG obtained by various types of processes described above. The above-described processes such as smoothing a borderline, various corrections, and cropping a rectangular image, preferably regarding the necessity of execution or the various settings, are controlled by the user's operation of an icon displayed on the display device 32 through the application software for reading. In addition, storing of the composite image data DG in the storage device is preferably instructed by the user by operating an icon displayed on the display device 32 through the application software for reading.

As described above, the image-reading apparatus 1A according to the present embodiment captures an image of the medium P exposed to the interior of the case 21f through the opening 22. This operation eliminates the conveyance of the medium P and the movement of the image capturing unit 31 being in contact with the medium P, thereby reducing the damage on the medium P. In addition, a user can generate image data (the first image data D1, the second image data D2, and the composite image data DG) by only placing the image-reading apparatus 1A manually onto the placement surface Q where the medium P is placed on. The user can generate image data by moving the image-reading apparatus 1A to the placement surface Q where the medium P is placed on, thereby readily converting the medium P into image data. The case 2 can block the ambient light from irradiating the interior of the case 21f, when the case 2 is disposed to closely come into contact with the placement surface Q where the medium P is placed on. Accordingly, since the image capturing unit 31 can capture an image of the medium P irradiated with only the light from the light sources 24, the image capturing unit 31 prevents the image quality of the captured images from being reduced due to external perturbations, thereby generating high-quality image data.

During image-capturing by the image capturing unit 31, since the light is emitted to different areas on the horizontal plane in the opening 22 (e.g., the main irradiated areas La and Lc, and the main irradiated areas Lb and Ld), the reflections (the reflections Pa and Pb) are prevented from occurring in the same area in the generated pieces of image data (the first image data D1 and the second image data D2). Accordingly, the area where the reflections occur can be eliminated from the image data by extracting the areas where no reflection occurs from the pieces of image data to generate the composite image data DG. This operation enables the composite image data DG to include areas having only high-quality images from the pieces of image data, whereby high-quality image data can be generated.

In addition, in the image-reading apparatus 1A according to the present embodiment, the target medium P is irradiated with the light from the light sources 24 obliquely to form a shadowed area, and accordingly, the borderline between the medium P and the background is emphasized. Specifically, when cropping of a rectangular image is made based on a shadowed area corresponding to one side generated by light from one direction, the accuracy of the cropping of an image of the medium P may be reduced if the background and the outline of the medium P are of the same color. By contrast, in the image-reading apparatus 1A according to the present embodiment, image-capturing is made on the medium P while switching a plurality of light sources 24, thereby obtaining a plurality of shadowed areas S1 and S2. Since the outline of the target medium P is detected in high-quality, even if the background and the medium P are of the same color or even if the background has a complicated pattern, cropping of an image of the medium P can be performed with high accuracy, which results in further improvement of the accuracy of cropping of a rectangular image. Therefore, higher-quality image data can be generated.

In the present embodiment, the external device 3 is detachably attached to the case 2, accordingly, the image capturing unit 31 and the display device 32 can be removed from the case 2. Therefore, the image-reading apparatus 1A can be constituted with an existing external device 3 already owned by the user, even if the casing 2 has no set of the image capturing unit 31 and the display device 32. This simplifies the configuration of the case 2, thereby reducing the manufacturing cost of the case 2. The case 2 does not include the image capturing unit 31 or the display device 32, each of which is an electronic component, thereby reducing a rate of occurrence of failures and the like, leading to increased durability of the case 2.

In the above-described embodiment, in the process of cropping a rectangular image illustrated in FIG. 11, as illustrated in FIGS. 12 through 18, each of the light sources 24 emits light in such a direction so as to form the shadowed area S1 or S2 outside of the edges of the two opposite sides among the four sides of the edges of the medium P. This description is provided merely for exemplary purpose and is not limiting. For another example, as illustrated in FIGS. 19 and 20, each of the light sources 24 may emit light to form a shadowed area S1' or S2' in directions such that, when adjacent two sides of the edges, out of four sides of the edges of the medium P, are set as two groups of sides, which are diagonally opposite to each other, the light is irradiated in a direction to form the shadowed area S1' or S2' outside of the edges of the two groups of sides.

Figure 19:
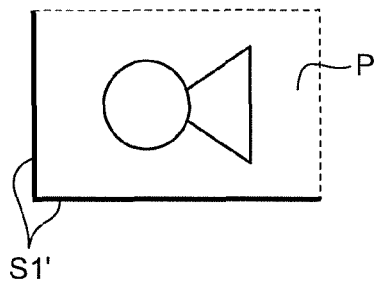
FIG. 19 is a view illustrating another example of an image of a medium including a shadowed area generated by a first light source according to the first embodiment.
Figure 20:
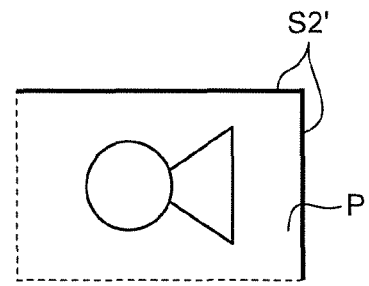
FIG. 20 is a view illustrating another example of an image of a medium including a shadowed area generated by a fourth light source according to the first embodiment.

FIG. 19 is a view illustrating another example of an image of a medium including a shadowed area generated by the first light source. FIG. 19 illustrates first image data D1' generated in image-capturing while the light source controller 27a turns on the first light source 24a only. As illustrated in FIG. 19, the shadowed area S1' is formed outside of the adjacent edges of the medium P located almost diagonally from the position where the first light source 24a is disposed. FIG. 20 is a view illustrating another example of an image of a medium including a shadowed area generated by the fourth light source. FIG. 20 illustrates second image data D2' generated in image-capturing while the light source controller 27a turns on the fourth light source 24d only disposed diagonally from the position where the first light source 24a is disposed. As illustrated in FIG. 20, the shadowed area S2' is formed outside of adjacent edges of the medium P located almost diagonally from the position where the fourth light source 24d is disposed.

Figure 21:
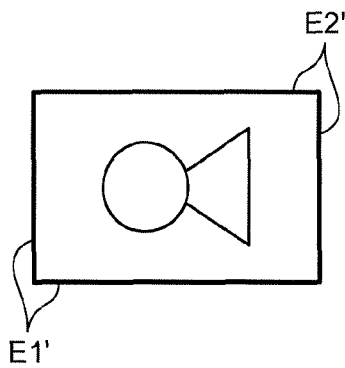
FIG. 21 is a view illustrating another example of a detection result of edges corresponding to the shadowed areas of the medium according to the first embodiment.

In this example, the edge detector 33b of the image-processing unit 33 performs edge detection on the area corresponding to the medium P in the composite image data DG'. The composite image data DG' is obtained by combining the first image data D1' including the shadowed area S1' illustrated in FIG. 19 with the second image data D2' including the shadowed area S2' illustrated in FIG. 20 (refer to FIG. 21). FIG. 21 is a view illustrating another example of a detection result of edges corresponding to the shadowed areas of the medium. The detection result in FIG. 21 illustrates that the edge detector 33b detects an edge E1' corresponding to the shadowed area S1' illustrated in FIG. 19 and an edge E2' corresponding to the shadowed area S2' illustrated in FIG. 20.

Second Embodiment

Figure 22:
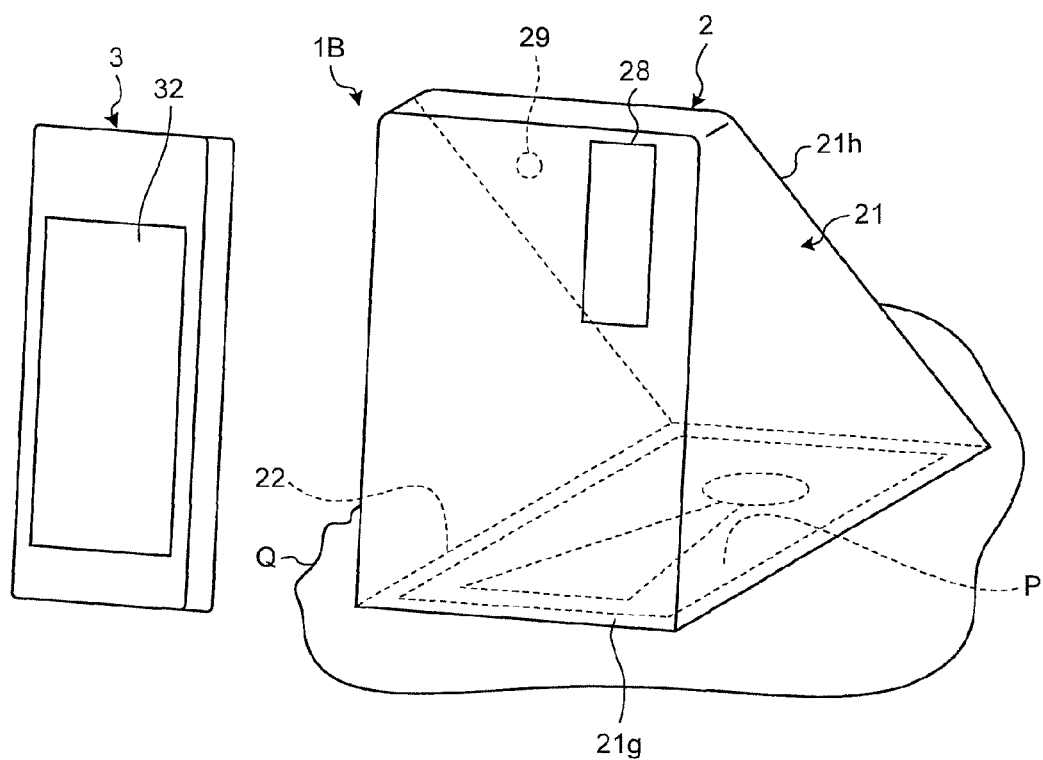
FIG. 22 is an external view of an image-reading apparatus according to a second embodiment of the present invention.
Figure 23:
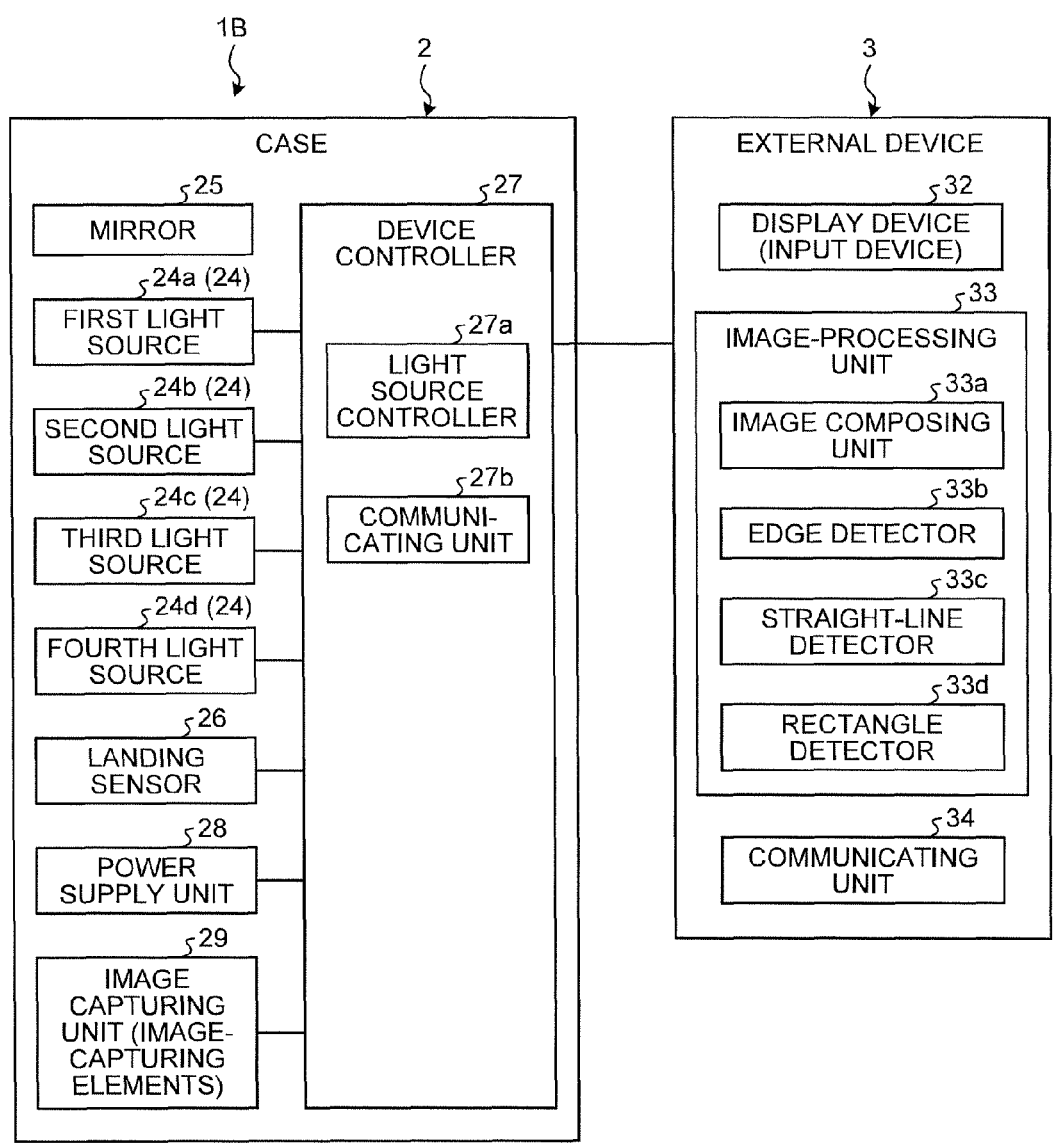
FIG. 23 is a view illustrating an example of the outline configuration of the image-reading apparatus according to the second embodiment.

The following describes an image-reading apparatus according to a second embodiment. FIG. 22 is an external view of the image-reading apparatus according to the second embodiment. FIG. 23 is a view illustrating an example of the outline configuration of the image-reading apparatus according to the second embodiment. An image-reading apparatus 1B according to the second embodiment differs from the image-reading apparatus 1A according to the first embodiment in that, as illustrated in FIGS. 22 and 23, the case 2, rather than the external device 3, includes an image capturing unit 29. The basic configuration of the image-reading apparatus 1B is almost the same as that of the image-reading apparatus 1A; therefore, descriptions of the numerals identical to those of the components in the image-reading apparatus 1A will be omitted or simplified.

The case 2 has no storage portion 23 for holding the external device 3, thus cannot have the external device 3 attached thereto. Accordingly, unlike the case 2 according to the first embodiment, the image capturing unit 29 is fixed rather than detachably provided in the case 2 according to the present embodiment.

The image capturing unit 29 captures an image of the medium P exposed to the interior of the case 21f through the opening 22. The image capturing unit 29 is provided on the position almost the same as that of the image capturing unit 31 of the external device 3 stored in the storage portion 23 with respect to the case 2 according to the first embodiment. The image capturing unit 29 captures an image of the opening 22 through the mirror 25.

The communicating unit 27b according to the present embodiment transmits an image signal output from the image capturing unit 29. By contrast, the communicating unit 34 receives an image signal output from the communicating unit 27b.

The external device 3 includes at least the display device 32, the image-processing unit 33, the communicating unit 34, a not-illustrated power supply unit, and a not-illustrated storage device. The external device 3 may include an image capturing unit. That is, the image capturing unit 29 of the case 2 functions as the image capturing unit of the image-reading apparatus 1B.

Figure 24:
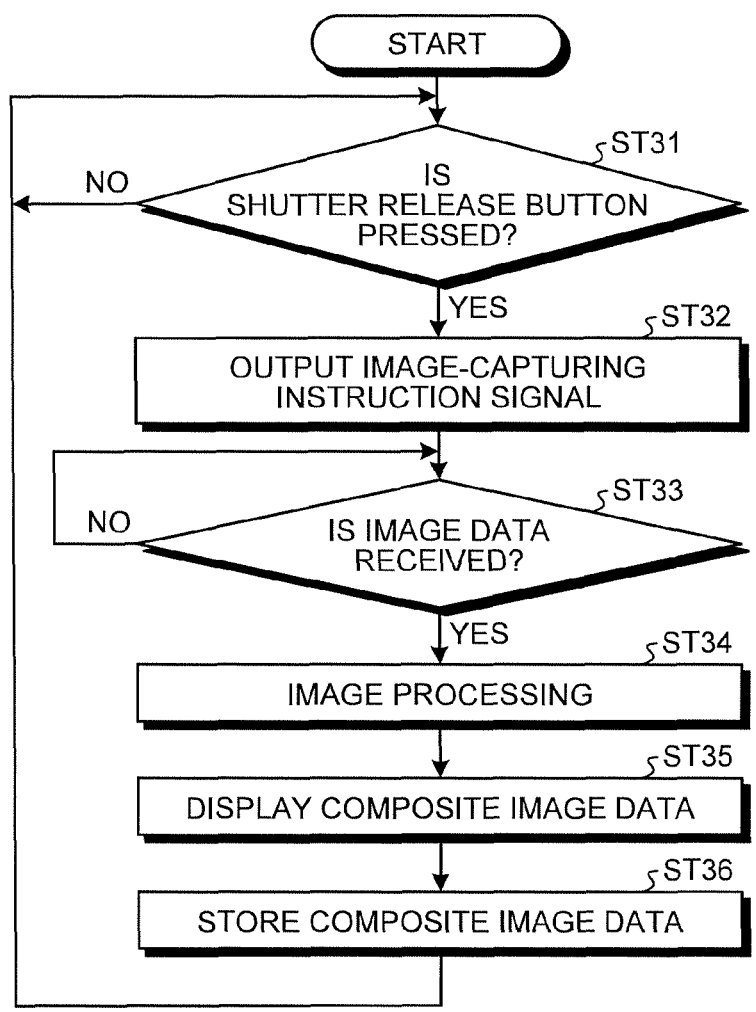
FIG. 24 is a flowchart diagram of reading operations in the image-reading apparatus according to the second embodiment.
Figure 25:
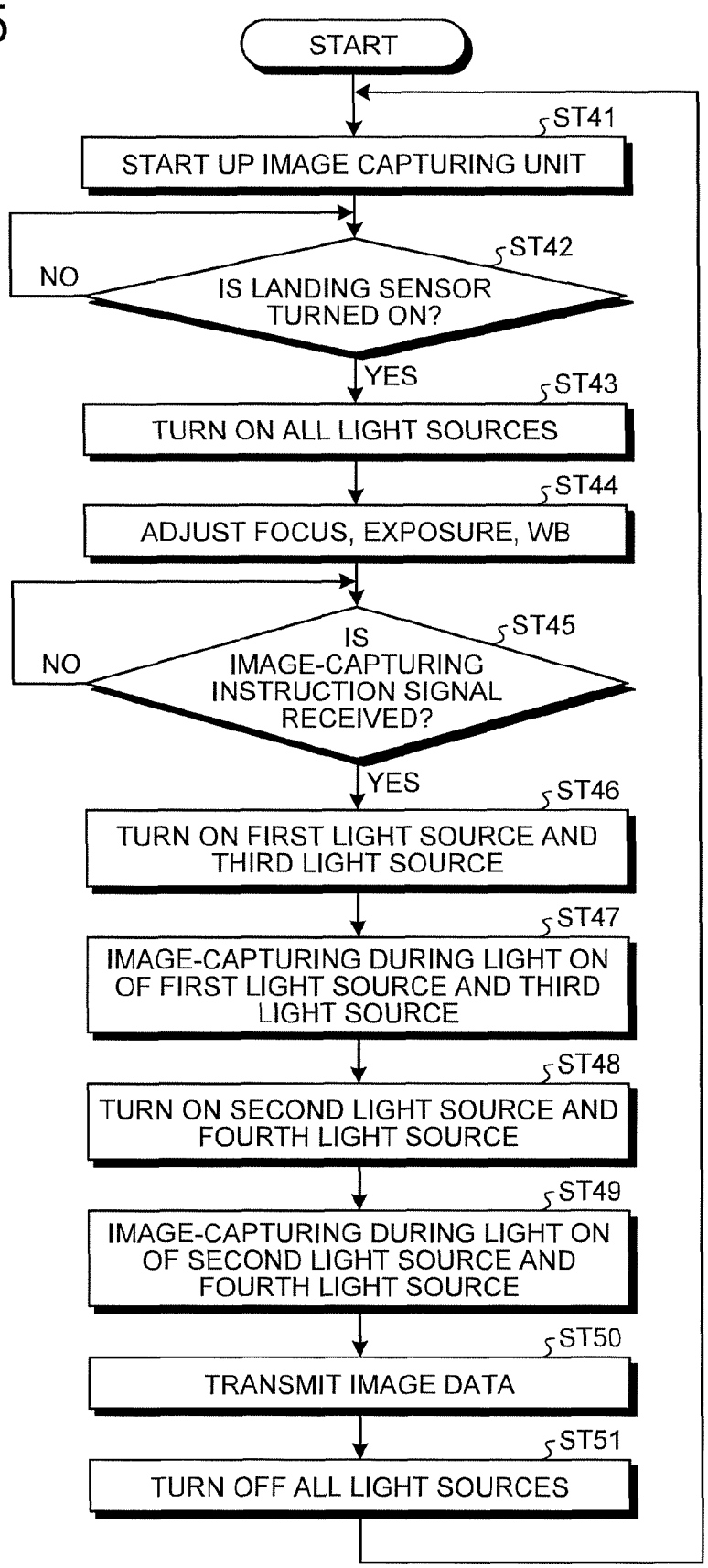
FIG. 25 is a flowchart diagram of reading operations in the image-reading apparatus according to the second embodiment.

The following describes the reading of the medium P by the image-forming apparatus 1B according to the present embodiment. FIGS. 24 and 25 are flowchart diagrams of reading operations of the image-reading apparatus according to the second embodiment. The reading of the medium P by the image-reading apparatus 1B is performed with the external device 3 detached from the case 2. The basic operation of the image-reading apparatus 1B is almost the same as that of the image-reading apparatus 1A; therefore, descriptions of the numerals identical to those of the components in the image-reading apparatus 1A will be omitted or simplified.

Firstly, as illustrated in FIG. 25, the case 2 starts up the image capturing unit 29 based on an instruction by a user to execute the application software for reading in the external device 3 (Step ST41). The execution instruction given by the user causes the external device 3 to transmit an execution instruction signal through the communicating unit 34 and the communicating unit 27b to the image capturing unit 29 of the case 2. The image capturing unit 29 receives the execution instruction signal and starts up to continue image-capturing the opening 22. The pieces of image data generated by the image capturing unit 29 are sequentially output through the communicating unit 27b and the communicating unit 34 to the display device 32 on which the images based on the pieces of image data are sequentially displayed. During the operations, the light sources 24 are in the turned-off state. The external device 3 determines whether the shutter release icon is pressed (Step ST31) repeatedly until the shutter release icon is pressed and stands by until the shutter release icon is pressed. The device controller 27 determines whether the landing sensor 26 is turned ON (Step ST42) repeatedly until the landing sensor 26 is turned ON and stands by until the landing sensor 26 is turned ON.

When the user arranges the case 2 to closely come into contact with the placement surface Q on which the medium P is placed, the device controller 27 determines that the landing sensor 26 is ON (Yes at Step ST42) and turns on all of the light sources (Step ST43). This enables the display device 32 to display images captured by the image capturing unit 29 with the light sources 24 in the light-on state.

The case 2 subsequently performs adjustments of focus, exposure, and white balance (WB) (Step ST44). The image capturing unit 29 performs these adjustments by setting image-capturing conditions of the image capturing unit 29 based on the environment of the interior of the case 21f. The light source controller 27a determines whether a later-described image-capturing instruction signal is received (Step ST45) repeatedly until the image-capturing instruction signal is received and stands by until the image-capturing instruction signal is received.

When the user presses the shutter release icon on the display device 32, as illustrated in FIG. 24, the external device 3 determines that the shutter release icon is pressed (Yes at Step ST31) and outputs an image-capturing instruction signal (Step ST32). The image-processing unit 33 determines whether a piece of image data is received (Step ST33) repeatedly until the piece of image data is received and stands by until the piece of image data is received.

The case 2 receives the image-capturing instruction signal (Yes at Step ST45) and turns on the first light source 24a and the third light source 24c (Step ST46). The light source controller 27a once turns off the first light source 24a, the second light source 24b, the third light source 24c, and the fourth light source 24d, and then turns on the first light source 24a and the third light source 24c. In the case 2, the image capturing unit 29 performs image-capturing while the first light source 24a and the third light source 24c are turned on (Step ST47). The image capturing unit 29 according to the present embodiment generates first image data D1 on which the reflections Pa occur corresponding to the first light source 24a and the third light source 24c.

Subsequently, in the case 2, the second light source 24b and the fourth light source 24d are turned on (Step ST48). Specifically, the light source controller 27a turns off the first light source 24a and the third light source 24c and then turns on the second light source 24b and the fourth light source 24d. In the case 2, the image capturing unit 29 performs image-capturing while the second light source 24b and the fourth light source 24d are turned on (Step ST49). The image capturing unit 29 according to the present embodiment generates second image data D2 on which the reflections Pb occur corresponding to the second light source 24b and the fourth light source 24d.

Subsequently, the case 2 transmits the image data (Step ST50). Specifically, the image capturing unit 29 transmits both the generated pieces of image data D1 and D2 through the communicating unit 27b and the communicating unit 34 to the image-processing unit 33. Subsequently in the case 2, all of the light sources 24 are turned off (Step ST51). Specifically, the light source controller 27a turns off the second light source 24b and the fourth light source 24d that have been turned on.

Upon receiving the image data, (Yes at Step ST33), the external device 3 performs image processing (Step ST34). The image-processing unit 33 mainly performs image processing of generating composite image data DG and a correction of the composite image data DG, in the same manner as in the first embodiment. Subsequently, the external device 3 displays on the display device 32 an image based on the composite image data DG (Step ST35). Subsequently, the external device 3 stores the composite image data DG (Step ST36).

As described above, the image-reading apparatus 1B according to the present embodiment can reduce the damage on the medium P and readily convert the medium P into image data, thereby generating high-quality image data. The external device 3 may not use its image capturing unit because the case 2 includes the image capturing unit 29. That is, the image capturing unit of the external device 3 is not necessarily exposed to the interior of the case 21f, thus an image of the medium P can be read with the case 2 separated from the external device 3. Therefore, the external device 3, which is the image-reading apparatus 1B, has no restriction or limitation on a shape of the external device 3 or position of the image capturing unit. Various types of external devices can be used as the external device 3 of the image-reading apparatus 1B.

In the first and the second embodiments, the information exchange between the case 2 and the external device 3 are executed by the communicating unit 27b and the communicating unit 34. This description is provided merely for exemplary purpose and is not limiting. The information exchange between the case 2 and the external device 3 may be executed in another method, through wired communications, for example, in which the case 2 and the external device 3 are electrically coupled to each other using a signal line. For another example, the information exchange between the case 2 and the external device 3 may be executed through acoustic communications using a sound, like an ultrasonic band. Alternatively, the information exchange between the case 2 and the external device 3 may be executed through vibration detection using a vibration generator such as an eccentric motor and a vibration receiver such as an accelerometer in a combined manner.

Third Embodiment

Figure 26:
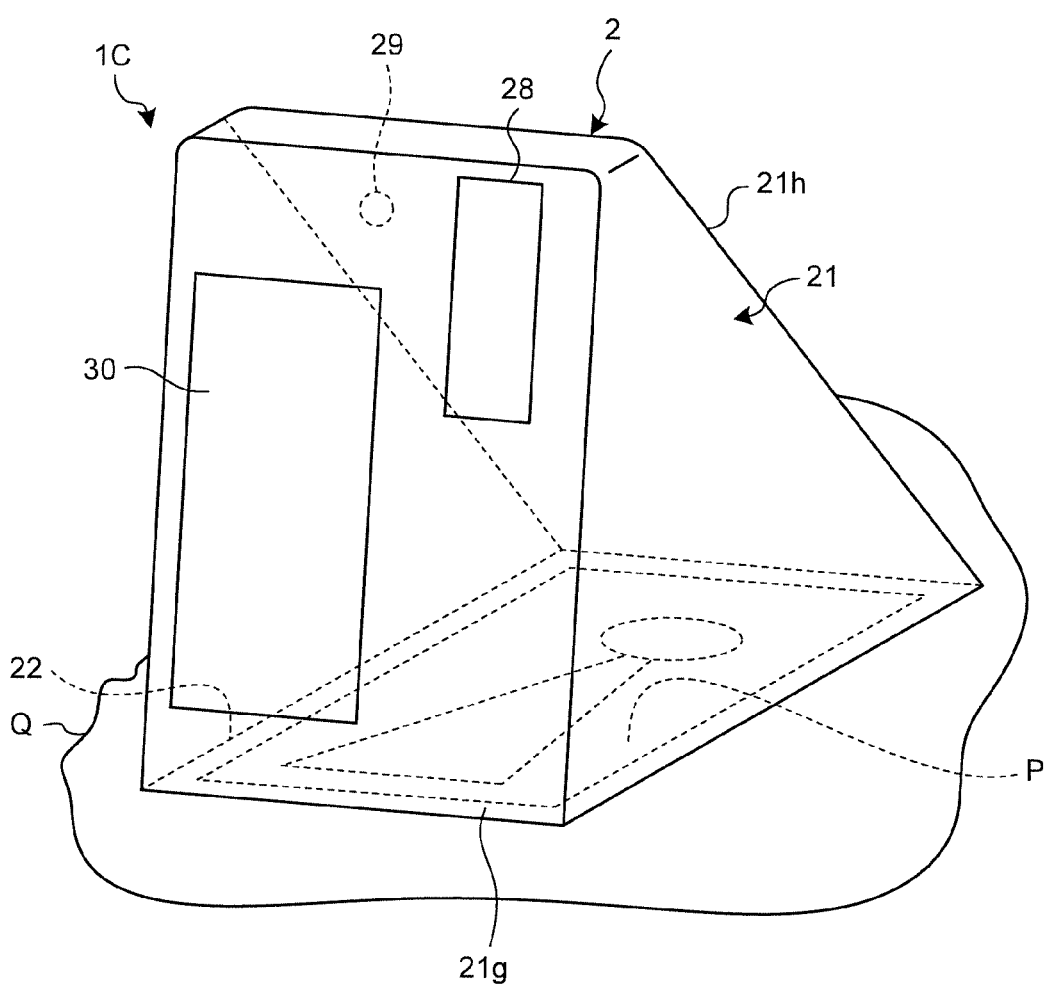
FIG. 26 is an external view of an image-reading apparatus according to a third embodiment of the present invention.
Figure 27:
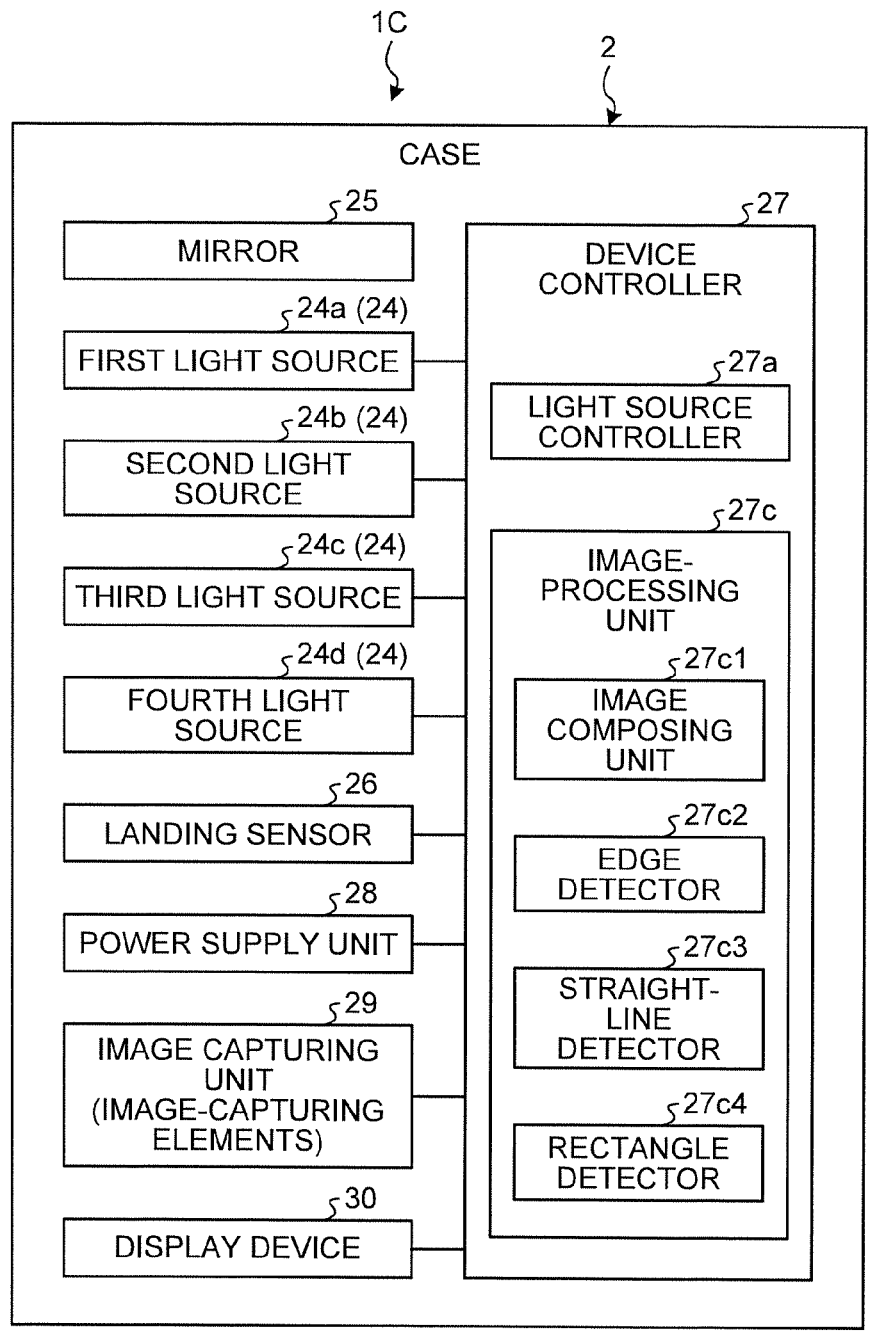
FIG. 27 is a view illustrating an example of the outline configuration of the image-reading apparatus according to the third embodiment.

The following describes an image-reading apparatus according to a third embodiment. FIG. 26 is an external view of the image-reading apparatus according to the third embodiment. FIG. 27 is a view illustrating an example of the outline configuration of the image-reading apparatus according to the third embodiment. An image-reading apparatus 10 according to the third embodiment differs from the image-reading apparatus 1A according to the first embodiment in that, as illustrated in FIGS. 26 and 27, the case 2 includes an image capturing unit 29 and a display device 30 and the external device 3 is not provided. The basic configuration of the image-reading apparatus 10 is almost the same as that of the image-reading apparatus 1A; therefore, descriptions of the numerals identical to those of the components in the image-reading apparatus 1A will be omitted or simplified.

Unlike the case 2 according to the first embodiment, according to the third embodiment, the image capturing unit 29 and the display device 30 are fixed, not detachably provided in the case 2.

The image capturing unit 29 captures an image of the medium P exposed to the interior of the case 21f through the opening 22. The image capturing unit 29 is provided on the position almost the same as that of the image capturing unit 31 of the external device 3 stored in the storage portion 23 with respect to the case 2 according to the first embodiment. The image capturing unit 29 captures an image of the opening 22 through the mirror 25.

The display device 30 displays an image of the medium P captured by the image capturing unit 29. The display device 30 is disposed on the inclined surface 21g and can be visually recognized from the outside of the case 2.

The image-processing unit 27c is included in the device controller 27 as a function and processes image data corresponding to an image of the medium P captured by the image capturing unit 29. The image-processing unit 27c further includes an image composing unit 27c1, an edge detector 27c2, a straight-line detector 27c3, and a rectangle detector 27c4.

The following describes the reading of the medium P by the image-reading apparatus 10 according to the present embodiment. FIG. 28 is a flowchart diagram of reading operations of the image-reading apparatus according to the third embodiment. The reading of the medium P by the image-reading apparatus 10 is performed in the case 2. The basic operation of the image-reading apparatus 1C is almost the same as that of the image-reading apparatuses 1A and 1B; therefore, descriptions of the numerals identical to those of the components in the image-reading apparatuses 1A and 1B will be omitted or simplified.

Firstly, as illustrated in FIG. 28, the case 2 starts up the image capturing unit 29 based on an instruction by a user to execute the application software for reading (Step ST61). This operation starts the image capturing unit 29 to continue image-capturing the opening 22 and enables the image signals to be sequentially output to the image-processing unit 27c. The image-processing unit 27c sequentially generates a plurality of pieces of image data based on which images are generated and sequentially displayed on the display device 30. During the operations, the light sources 24 are in the turned-off state. The device controller 27 determines whether the landing sensor 26 is turned ON (Step ST62) repeatedly until the landing sensor 26 is turned ON and stands by until the landing sensor 26 is turned ON.

When the user disposes the case 2 to closely come into contact with the placement surface Q on which the medium P is placed, the device controller 27 determines that the landing sensor 26 is ON (Yes at Step ST62) and turns on all of the light sources (Step ST63). This enables the display device 30 to display images captured by the image capturing unit 29 with the light sources 24 in the light-on state.

The case 2 subsequently performs adjustments of focus, exposure, and white balance (WB) (Step ST64). The image-processing unit 27c performs these adjustments by setting image-capturing conditions of the image capturing unit 29 based on the environment of the interior of the case 21f. When the user presses the shutter release icon on the display device 30, the case 2 determines that the shutter release icon is pressed (Yes at Step ST65) and turns on the first light source 24a and the third light source 24c (Step ST66). In the case 2, the image capturing unit 29 performs image-capturing while the first light source 24a and the third light source 24c are turned on (Step ST67). Subsequently in the case 2, the second light source 24b and the fourth light source 24d are turned on (Step ST68). In the case 2, the image capturing unit 29 performs image-capturing while the second light source 24b and the fourth light source 24d are turned on (Step ST69). The image-processing unit 27c generates both pieces of image data D1 and D2.

Subsequently, the case 2 performs image processing (Step ST70). The image-processing unit 27c mainly performs image processing of generating composite image data DG and correction of the composite image data DG, in the same manner as in the first embodiment. Subsequently, the case 2 displays on the display device 30 an image based on the composite image data DG (Step ST71). Subsequently, the case 2 stores the composite image data DG (Step ST72). Subsequently in the case 2, all of the light sources 24 are turned off (Step ST73).

As described above, the image-reading apparatus 10 according to the present embodiment can reduce the damage on the medium P and readily convert the medium P into image data, thereby generating high-quality image data. The external device 3 is not required because the case 2 includes the image capturing unit 29 and the display device 30. That is, the medium P can be read with the case 2 alone.

In the third embodiment, the image-reading apparatus 10 may include the communicating unit 27b for the purpose of externally transmitting the stored composite image data DG, in the same manner as in the first and the second embodiments. The image-reading apparatus 10 may also include a slot for electrical connection to a recording medium.

The case 2 according to the first through the third embodiments includes the power supply unit 28. Alternatively, an external power source may supply the power to the components and devices in the case 2. Examples of such an external power source include commercial power supply, photovoltaic power generation, and a power supply unit like the one mounted on the external device 3.

In the first through the third embodiments, the first light source 24a and the third light source 24c are disposed on the inner side surface 21a, and the second light source 24b and the fourth light source 24d are disposed on the inner side surface 21b opposite to the inner side surface 21a. This description is provided merely for exemplary purpose and is not limiting. The first light source 24a and the third light source 24c, and the second light source 24b and the fourth light source 24d may be disposed in other positions so that their respective main irradiated areas La and Lc, and the main irradiated areas Lb and Ld, opposite to each other, do not overlap with each other. The first light source 24a, the second light source 24b, the third light source 24c, and the fourth light source 24d may be disposed in an identical plane (e.g., on the inner side surface 21a, on the inner side surface 21b, or on the exposing face 21c) at different heights or in parallel at the same height, by adjusting the optical axis of the respective light sources 24. Alternatively, the main irradiated areas La and Lc, and the main irradiated areas Lb and Ld, which do not overlap with each other, may be achieved by adjusting the optical axis of the respective light-emitting devices included in the light sources 24.

In the first through the third embodiments, the light sources 24 include four light sources. The description is provided merely for exemplary purpose and is not limiting. The number of light sources included in the light sources 24 may be less than four, or five or more if different areas in the horizontal plane in the opening 22 are irradiated with light from the light sources. In this example, because the image capturing unit 29 or 31 captures an image of the medium P exposed to the interior of the case 21f through the opening 22 for every light-on state of the light sources, the number of generated pieces of image data is equal to the number of light sources. The image-processing unit 27c or 33 extracts the areas where no reflection occurs from the pieces of image data and generates the composite image data DG. In the first through the third embodiments, if the landing sensor 26 is ON, all of the light sources 24 are turned on. The description is provided merely for exemplary purpose and is not limiting. At least one of the light sources 24 needs to be turned on.

The image-reading apparatus according to the present disclosure can reduce damage on a medium and readily convert a medium into image data, and is capable of cropping an image of the medium with high accuracy if the background and the medium are of the same color or if the background has a complicated pattern, thereby providing advantageous effects of generating high-quality image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading apparatus comprising:
a case constituted to shut off ambient light and including an opening on a bottom surface thereof;
an image capturing unit capturing an image of a medium exposed to an interior of the case through the opening;
a plurality of light sources disposed in the interior of the case to emit light to the opening; and
an image-processing unit configured to perform a plurality of image capturing by the image capturing unit, and perform composition process on a plurality of pieces of image data captured by the image capturing unit, wherein
the light sources are arranged to emit light in a direction to form shadowed areas outside of different edges of the medium when an area of the medium exposed to the interior of the case is smaller than an area of the opening, and
the image-processing unit is configured to extract the edges based on the shadowed areas in the pieces of image data and crops the medium from the image data obtained by the composition process based on the extracted edges.

2. The image-reading apparatus according to claim 1, wherein
the medium has a rectangular shape, and
the light sources are arranged to emit light in directions to form the shadowed areas outside of the opposite two edges corresponding to respective two opposite sides, among four edges of the medium.

3. The image-reading apparatus according to claim 2, wherein the image-processing unit is configured to extract the two opposite edges corresponding to the respective two opposite sides of the medium, based on the shadowed areas, in the pieces of image data,
the image-processing unit is configured to connect respective ends of the extracted edges to presume virtual edges corresponding to remaining two sides of the medium, and
the image-processing unit is configured to crop an image of the medium from the image data obtained by the composition process based on the edges and the virtual edges.

4. The image-reading apparatus according to claim 1, wherein
the medium has a rectangular shape, and among four sides of the medium, two groups of sides, each group of sides containing two adjacent sides, are diagonally arranged, and
the light sources are arranged to emit light in directions to form shadowed areas outside of the edges of the two groups of sides which are diagonally opposite to each other.

5. The image-reading apparatus according to claim 1, wherein
the image capturing unit captures an image of the medium a plurality of times consecutively, and
among the plurality of light sources, when the image capturing unit performs the image-capturing, at least one light source is turned on that is different from the light sources turned on in the previous image-capturing.

6. The image-reading apparatus according to claim 1, further comprising a display device that displays an image of the medium captured by the image capturing unit.

7. The image-reading apparatus according to claim 6, further comprising an image-capturing state detector that detects whether image-capturing by the image capturing unit is ready, wherein
when the image-capturing state detector detects that image-capturing by the image capturing unit is ready, at least one of the light sources is turned on, and
the display device displays an image of the medium captured while one or more of the light sources are turned on.

8. The image-reading apparatus according to claim 1, wherein the image capturing unit is detachably attached to the case.

9. The image-reading apparatus according to claim 1, wherein the display device is mounted on an external device different from the case.

10. The image-reading apparatus according to claim 1, wherein
the case includes an exposing surface exposing the image capturing unit to the interior of the case, and an opposed surface opposite to the exposing face, and a distance between the exposing face and the opposed surface expands toward the opening,
the opposed surface includes a mirror, and
the image capturing unit is disposed to capture the medium through the mirror.

* * * * *